United States Patent
Torvinen et al.

(10) Patent No.: US 11,659,382 B2
(45) Date of Patent: May 23, 2023

(54) SECURITY SOLUTION FOR SWITCHING ON AND OFF SECURITY FOR UP DATA BETWEEN UE AND RAN IN 5G

(71) Applicant: Telefonaktiebolaget LM Ericsson (publ), Stockholm (SE)

(72) Inventors: Vesa Torvinen, Sauvo (FI); Noamen Ben Henda, Stockholm (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 115 days.

(21) Appl. No.: 16/494,660

(22) PCT Filed: Mar. 16, 2018

(86) PCT No.: PCT/EP2018/056751
§ 371 (c)(1),
(2) Date: Sep. 16, 2019

(87) PCT Pub. No.: WO2018/167307
PCT Pub. Date: Sep. 20, 2018

(65) Prior Publication Data
US 2020/0100101 A1 Mar. 26, 2020

Related U.S. Application Data

(60) Provisional application No. 62/472,722, filed on Mar. 17, 2017.

(51) Int. Cl.
*H04W 40/36* (2009.01)
*H04W 36/02* (2009.01)
(Continued)

(52) U.S. Cl.
CPC ......... *H04W 12/009* (2019.01); *H04L 63/205* (2013.01); *H04W 12/033* (2021.01); *H04W 12/106* (2021.01)

(58) Field of Classification Search
CPC ............. H04W 12/009; H04W 12/033; H04W 12/106; H04W 12/10; H04L 63/205; H04L 63/0428; H04L 63/123; H04L 63/162
See application file for complete search history.

(56) References Cited

U.S. PATENT DOCUMENTS 9,276,909 B2  3/2016  Barany et al.
9,344,945 B2  5/2016  Da Silva et al.
(Continued)

FOREIGN PATENT DOCUMENTS

CN   101072092 A   11/2007
CN   101075865 A   11/2007
(Continued)

OTHER PUBLICATIONS

Shiyue Nie, Yiming Zhang, Tao Wan, Haixin Duan, Song Li; "Measuring the Deployment of 5G Security Enhancement"; WiSec '22: Proceedings of the 15th ACM Conference on Security and Privacy in Wireless and Mobile Networks; May 2022, pp. 169-174 (Year: 2022).*

(Continued)

*Primary Examiner* — Kendall Dolly
*Assistant Examiner* — Courtney D Fields
(74) *Attorney, Agent, or Firm* — Rothwell, Figg, Ernst & Manbeck, P.C.

(57) ABSTRACT

Methods for operating a UE, a network node, a Session Management Function (SMF) and a Unified Data Management (UDM) are disclosed. The methods include transmitting, by a UE, a Protocol Data Unit (PDU) Session Establishment Request message toward an SMF in the communication network (902A), and receiving at the UE a policy decision on security protection of User Plane (UP) data terminating in a RAN for the PDU Session (904A). The (Continued)

policy decision received at the UE may be in accordance with a UP security policy provided by the SMF to the RAN during PDU Session Establishment. Also disclosed are a UE, network node, SMF and UDM.

18 Claims, 21 Drawing Sheets

(51) Int. Cl.
*H04W 12/00* (2021.01)
*H04L 9/40* (2022.01)
*H04W 12/033* (2021.01)
*H04W 12/106* (2021.01)

(56) References Cited

U.S. PATENT DOCUMENTS

| | | | |
|---|---|---|---|
| 9,794,836 B2 | 10/2017 | Liu et al. | |
| 2009/0086971 A1 | 4/2009 | Grayson et al. | |
| 2009/0238195 A1 | 9/2009 | Pyykkonen | |
| 2010/0054472 A1 | 3/2010 | Barany et al. | |
| 2010/0158044 A1 | 6/2010 | Ray et al. | |
| 2010/0235634 A1 | 9/2010 | Fischer | |
| 2011/0312299 A1 | 12/2011 | Patil et al. | |
| 2012/0315878 A1 | 12/2012 | Deng | |
| 2013/0236016 A1* | 9/2013 | Zhang | H04W 12/033 380/270 |
| 2014/0355762 A1 | 12/2014 | Zhang et al. | |
| 2015/0139156 A1 | 5/2015 | Thakur et al. | |
| 2017/0012956 A1 | 1/2017 | Lee et al. | |
| 2018/0227302 A1* | 8/2018 | Lee | H04W 12/0431 |
| 2019/0394651 A1 | 12/2019 | Wifvesson | |
| 2021/0235339 A1* | 7/2021 | Babaei | H04W 76/27 |

FOREIGN PATENT DOCUMENTS

| | | | |
|---|---|---|---|
| CN | 101810017 A | 8/2010 | |
| CN | 102123391 A | 7/2011 | |
| CN | 101128066 B | 7/2012 | |
| CN | 102132541 B | 8/2014 | |
| EP | 2 293 515 A1 | 3/2011 | |
| EP | 2 804 409 A1 | 11/2014 | |
| EP | 3 046 384 A1 | 7/2016 | |
| RU | 2 523 695 C1 | 7/2014 | |
| RU | 2 600 456 C1 | 10/2016 | |
| WO | 2010/025280 A2 | 3/2010 | |
| WO | WO-2020172656 A1 * | 8/2020 | H04L 47/34 |

OTHER PUBLICATIONS

International Search Report and Written Opinion issued in International Application No. PCT/EP2018/056751, dated Jun. 25, 2018, 14 pages.
Written Opinion of the International Preliminary Examining Authority issued in International Application No. PCT/EP2018/056751, dated Feb. 11, 2019, 6 pages.
International Preliminary Report on Patentability issued in International Application No. PCT/EP2018/056751, dated Jun. 21, 2019, 9 pages.
3GPP TR 33.899 V1.0.0 (Mar. 2017), 3rd Generation Partnership Project; Technical Specification Group Services and System Aspects; Study on the security aspects of the next generation system (Release 14), Mar. 2017, 471 pages.
3GPP TS 23.501 V0.3.0 (Feb. 2017), 3rd Generation Partnership Project; Technical Specification Group Services and System Aspects; System Architecture forthe 5G System; Stage 2 (Release 15), Feb. 2017, 97 pages.
3GPP TR 33.889 V0.5.0 (Apr. 2015), 3rd Generation Partnership Project; Technical Specification Group Services and System Aspects; Study on Security aspects of Machine-Type Communications (MTC) architecture and feature enhancements (Release 13), Apr. 2015, 25 pages.
3GPP TR 38.804 V0.7.0 (Feb. 2017), 3rd Generation Partnership Project; Technical Specification Group Radio Access Network; Study on New Radio Access Technology; Radio Interface Protocol Aspects, 53 pages.
3GPP TS 23.502 V0.2.0 (Feb. 2017), 3rd Generation Partnership Project; Technical Specification Group Services and System Aspects; Procedures forthe 5G System; Stage 2 (Release 15), Feb. 2017, 71 pages.
Ericsson, Claue 6 (user plane security—security policy), 3GPP TSG SA WG3 (Security) Meeting #90, S3-180286, Gothenburg, Sweden, Jan. 22-26, 2018, 3 pages.
3GPP TR 33.801, V1.0.0, (Nov. 2005), 3rd Generation Partnership Project; Technical Specification Group Service and System Aspects; Access Security Review (Release 7), Nov. 2005 (41 pages).
3GPP TR 23.799, V14.0.0, (Dec. 2016), 3rd Generation Partnership Project; Technical Specification Group Services and System Aspects; Study on Architecture for Next Generation System (Release 14), Dec. 2016 (522 pages).
International Search Report and Written Opinion issued in International Application No. PCT/EP2018/052285, dated Mar. 14, 2018, (10 pages).

* cited by examiner

SECURITY SOLUTION FOR SWITCHING ON AND OFF SECURITY FOR UP DATA BETWEEN UE AND RAN IN 5G

CROSS REFERENCE TO RELATED APPLICATION(S)

This application is a 35 U.S.C. § 371 National Stage of International Patent Application No. PCT/EP2018/056751, filed Mar. 16, 2018, designating the United States and claiming priority to U.S. provisional application No. 62/472,722, filed on Mar. 17, 2017. The above identified applications are incorporated by reference.

TECHNICAL FIELD

The present disclosure relates to the field of communications, and more particularly, to User Equipment (UE), radio access nodes, core network nodes, and related methods in a wireless communication network.

BACKGROUND

Security termination in the base-station of integrity protection and encryption of User Plane (UP) data sent between User Equipment (UE) and base-station in 5G, is one of the potential features discussed in a 3GPP SA3 study phase. Another option discussed in this 3GPP study phase is to support the security termination of UP data in the core network.

In Next Generation networks, SA2 has determined the following 5G system architecture for the non-roaming case in TS 23.501 v0.3.0 [1]. FIG. 1 is a block diagram of a non-roaming 5G system architecture in reference point representation. Referring to FIG. 1, the system includes: an Authentication Server Function (AUSF) a Unified Data Management (UDM); a Core Access and Mobility Management Function (AMF); a Session Management Function (SMF); a Policy Control Function (PCF); an Application Function (AF); a User Equipment (UE); a (Radio) Access Network ((R)AN)); a User Plane Function (UPF); and a Data Network (DN), e.g. operator services, Internet or 3rd party services. The term "(Radio) Access Network" and associated acronym "(R)AN" are used interchangeably herein as having the same meaning as the corresponding terms "Radio Access Network" and associated acronym "RAN".

In Next Generation networks, the Radio Access Network (RAN) may adopt RAN architecture and interfaces set out in TR 33.801 v1.0.0 [2]. FIG. 2 illustrates a potential new RAN architecture for Next Generation networks.

Referring to FIG. 2, it is expected that a gNB and a eLTE eNB can be connected to the same Next Generation Core (NGC). A gNB will be able to connect to other gNB(s) or (e)LTE eNBs over a new RAN interface named the Xn interface. A gNB 102 will be able to connect to other gNBs 102 or (e)LTE eNBs 104 over a new RAN interface named the Xn interface.

FIG. 3 illustrates a Quality of Service (QoS) architecture for NR and NextGen Core. The QoS architecture in NR and NextGen Core is described in in TR 38.804 V.0.7.0 [3] as, for each UE, the NextGen Core establishes one or more PDU Sessions. For each UE, the RAN establishes one or more Data Radio Bearers per PDU Session. The RAN maps packets belonging to different PDU sessions to different DRBs. Hence, the RAN establishes at least one default DRB for each PDU Session indicated by the Core Network, CN, upon PDU Session establishment. The NAS level packet filters in the UE and in the NextGen Core associate UL and DL packets with QoS Flows. AS-level mapping in the UE and in the RAN associate UL and DL QoS Flows with Data Radio Bearers (DRB).

Security termination in the base-station of integrity protection and/or encryption of UP data sent between UE and base-station in 5G, is one of the potential features discussed in 3GPP SA3 in the study phase. The other option discussed is to support the security termination of UP data in the core network in the UPF located beyond the RAN.

3GPP is discussing an implementation step wise introduction of both options described above, as including two Phases: Phase 1: Security termination of UP data is supported in base-station; and Phase 2, addition of security termination of UP data is supported in core network (UPF residing in core network). The core network would then need a mechanism where it could switch on and switch off security in RAN or UPF residing in core network. However, no known mechanism is provided to allow a Next Generation system to decide when to use UP encryption and/or UP integrity protection.

The approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section.

SUMMARY

According to an aspect of the present disclosure, there is provided a method for operating a User Equipment, UE, that is configured to wirelessly communicate with a communication network. The method comprises transmitting a Protocol Data Unit, PDU, Session Establishment Request message toward a Session Management Function, SMF, in the communication network, and receiving a policy decision on security protection of User Plane, UP, data terminating in a Radio Access Network, RAN, for the PDU Session.

According to examples of the present disclosure, the policy decision may indicate whether to operate using security protection that comprises at least one of encryption protection for UP data terminating in the RAN; and integrity protection for UP data terminating in the RAN.

According to examples of the present disclosure, the policy decision may be received in RRC signalling.

According to examples of the present disclosure, the policy decision may be received in an RRC Connection Reconfiguration message.

According to examples of the present disclosure, the method may further comprise activating encryption and/or integrity protection for the PDU Session if the received policy decision indicates so.

According to examples of the present disclosure, the method may further comprise receiving a decision from a home network that security protection of UP data terminating in the RAN is not to be used by the UE, and responsively precluding operational use by the UE of an algorithm to encrypt and/or integrity protect UP data sent on all radio bearers serving a Slice ID and/or a PDU Session ID between the UE and the RAN.

According to another aspect of the present disclosure, there is provided a User Equipment, UE, (1300) configured to perform the method of any preceding aspect or example of the present disclosure.

According to another aspect of the present disclosure, there is provided a User Equipment, UE, that is configured to wirelessly communicate with a communication network, the UE comprising a transceiver, a memory storing computer readable program code; and a processor connected to the transceiver and the memory to execute the computer readable program code to transmit a Protocol Data Unit, PDU, Session Establishment Request message toward a Session Management Function, SMF, in the communication network, and receive a policy decision on security protection of User Plane, UP, data terminating in a Radio Access Network, RAN, for the PDU Session.

According to examples of the present disclosure, the processor may further execute the computer readable program code to perform the method of any preceding aspect or example of the present disclosure.

According to another aspect of the present disclosure, there is provided a User Equipment, UE, that wirelessly communicates with a communication network, the UE performing operations comprising transmitting a Protocol Data Unit, PDU, Session Establishment Request message toward a Session Management Function, SMF, in the communication network, and receiving a policy decision on security protection of User Plane, UP, data terminating in a Radio Access Network, RAN, for the PDU Session.

According to examples of the present disclosure, the UE may perform operations comprising the method of any preceding aspect or example of the present disclosure.

According to another aspect of the present disclosure, there is provided a method for operating a network node of a communication network that is configured to communicate with a User Equipment, UE. The method comprises receiving a Protocol Data Unit, PDU, Session Establishment Request message from the UE, communicating a Session Management, SM, Request with the PDU Session Establishment Request to a Session Management Function, SMF of the communication network, and receiving from the SMF a SM Request Acknowledgement message that includes a policy for security protection of User Plane, UP, data terminating in a Radio Access Network, RAN.

According to examples of the present disclosure, the method may be performed by an Access and Mobility Management Function, AMF, in the communication network.

According to examples of the present disclosure, the method may further comprise communicating to the SMF, policy information that identifies whether the SMF is allowed to request a change to RAN security.

According to examples of the present disclosure, the method may further comprise communicating to the SMF, a default security policy value indicating at least one of: whether the UE uses encryption protection for UP data terminating in the RAN by default; and whether the UE uses integrity protection for UP data terminating in the RAN by default.

According to examples of the present disclosure, the policy for security protection of UP data terminating in a RAN may indicate whether to operate using security protection that comprises at least one of encryption protection for UP data terminating in the RAN; and integrity protection for UP data terminating in the RAN.

According to examples of the present disclosure, the policy for security protection of UP data terminating in a RAN may indicate whether integrity protection and/or encryption shall be used or not for data sent on all radio bearers serving the PDU Session.

According to examples of the present disclosure, the method may further comprise communicating the received policy for security protection of UP data terminating in a RAN to a RAN node.

According to another aspect of the present disclosure, there is provided a method for operating a network node of a communication network that is configured to communicate with a User Equipment, UE. The method comprises receiving from an Access and Management Function a message that includes a policy for security protection of User Plane, UP, data terminating in a Radio Access Network, RAN for a PDU session.

According to examples of the present disclosure, the method may be performed by a network node in the RAN.

According to examples of the present disclosure, the method may further comprise communicating to a UE requesting the PDU session a policy decision relating to the received policy for security protection of User Plane, UP, data terminating in a Radio Access Network, RAN for the PDU session.

According to examples of the present disclosure, the method may further comprise communicating to the UE, a policy decision indicating at least one of: whether UP data encryption termination in the RAN is used for the PDU Session; and whether UP data integrity protection termination in the RAN is used for the PDU Session.

According to examples of the present disclosure, the policy decision may be communicated in RRC signalling.

According to examples of the present disclosure, the policy decision may be communicated in an RRC Connection Reconfiguration message.

According to examples of the present disclosure, the method may further comprise including selected algorithms for integrity protection and/or encryption in the RRC Connection Reconfiguration message.

According to another aspect of the present disclosure, there is provided a network node of a communication network, the network node configured to perform the method of any preceding aspect or example of the present disclosure.

According to another aspect of the present disclosure, there is provided a network node of a communication network that is configured to communicate with a User Equipment, UE. The network node comprises a memory storing computer readable program code; and a processor connected to the memory to execute the computer readable program code to receive a Protocol Data Unit, PDU, Session Establishment Request message from the UE, communicate a Session Management, SM, Request with the PDU Session Establishment Request to a Session management Function, SMF of the communication network, and receive from the SMF a SM Request Acknowledgement message that includes a policy for security protection of User Plane, UP, data terminating in a Radio Access Network, RAN.

According to examples of the present disclosure, the processor may further execute the computer readable program code to perform the method of any preceding aspect or example of the present disclosure.

According to another aspect of the present disclosure, there is provided a network node that wirelessly communicates with a communication network, the network node performing operations comprising receiving a Protocol Data Unit, PDU, Session Establishment Request message from the UE, communicating a Session Management, SM, Request with the PDU Session Establishment Request to a Session management Function, SMF of the communication network, and receiving from the SMF a SM Request Acknowledgement message that includes a policy for security protection of User Plane, UP, data terminating in a Radio Access Network, RAN.

According to examples of the present disclosure, the network node may perform operations comprising the method of any preceding aspect or example of the present disclosure.

According to another aspect of the present disclosure, there is provided a method for operating a Session Management Function, SMF, of a communication network that is configured to communicate with a Access and Mobility Management Function, AMF, of the communication network. The method comprises receiving from the AMF a Session Management, SM, Request with a PDU Session Establishment Request for a UE, and communicating to the AMF a SM Request Acknowledgement message that includes a policy for security protection of User Plane, UP, data terminating in a Radio Access Network, RAN.

According to examples of the present disclosure, the policy for security protection of UP data terminating in a RAN may indicate whether integrity protection and/or encryption shall be used or not for data sent on all radio bearers serving the PDU Session.

According to examples of the present disclosure, the method may further comprise receiving with the SM request, policy information that identifies whether the SMF is allowed to request a change to RAN security.

According to examples of the present disclosure, the method may further comprise responsive the receiving, determining whether the SMF contains a common local policy that applies to all UEs and, if not, communicating a subscription data request to a Unified Data Management, UDM, to retrieve SM-related subscription data for the UE related with a Data Network Name, DNN.

According to examples of the present disclosure, the retrieved SM-related subscription data for the UE may identify whether to operate using security protection that comprises at least one of encryption protection for UP data terminating in the RAN, and integrity protection for UP data terminating in the RAN.

According to examples of the present disclosure, the SM Request Ack message may include a SMF request of security protection of UP data terminated in the RAN, a SMF decision of Core Network, CN, terminated security protection of UP data in a serving network, and/or a home network decision of CN terminated security protection of UP data in the home network.

According to examples of the present disclosure, the method may further comprise, responsive the receiving, obtaining a policy for security protection of UP data terminating in a RAN from a Policy Control Function.

According to another aspect of the present disclosure, there is provided a Session Management Function, SMF, (1700) of a communication network that is configured to communicate with an Access and Mobility Management Function, AMF, of the communication network, the SMF configured to perform the method any preceding aspect or example of the present disclosure.

According to another aspect of the present disclosure, there is provided a Session Management Function, SMF, of a communication network that is configured to communicate with a Access and Mobility Management Function, AMF, of the communication network, the SMF comprising a memory storing computer readable program code, and a processor connected to the memory to execute the computer readable program code to receive from the AMF a Session Management, SM, Request with a PDU Session Establishment Request for a UE, and communicate to the AMF a SM Request Acknowledgement message that includes a policy for security protection of User Plane, UP, data terminating in a Radio Access Network, RAN.

According to examples of the present disclosure, the processor may further execute the computer readable program code to perform the method of any preceding aspect or example of the present disclosure.

According to another aspect of the present disclosure, there is provided a Session Management Function, SMF, of a communication network that is configured to communicate with a Access and Mobility Management Function, AMF, of the communication network, the SMF performing operations comprising receiving from the AMF a Session Management, SM, Request with a PDU Session Establishment Request for a UE, and communicating to the AMF a SM Request Acknowledgement message that includes a policy for security protection of User Plane, UP, data terminating in a Radio Access Network, RAN.

According to examples of the present disclosure, the SMF may perform operations comprising the method of any preceding aspect or example of the present disclosure.

According to another aspect of the present disclosure, there is provided a method for operating a Unified Data Management, UDM, of a communication network that is configured to communicate with a Session Management Function, SMF, of the communication network. The method comprises receiving a subscription data request from the SMF for SM-related subscription data for a UE, and communicating a subscription data response indicating a home network preference related to a Radio Access Network, RAN, terminated User Plane, UP, data security for communications with the UE or decision on home network terminated UP data security for communications with the UE.

According to examples of the present disclosure, the subscription data response may indicate whether UP data encryption terminating in the RAN should be used, must be used, or is indifferent for use with the UE.

According to examples of the present disclosure, the subscription data response may indicate whether UP data integrity protection terminating in the RAN should be used, must be used, or is indifferent for use with the UE.

According to examples of the present disclosure, the subscription data response may indicate whether UP data encryption and/or integrity protection should be terminated in a Core Network, CN, in the home network.

According to another aspect of the present disclosure, there is provided a Unified Data Management, UDM, of a communication network that is configured to communicate with a Session Management Function, SMF, of the communication network, the UDM configured to perform the method of any preceding aspect or example of the present disclosure.

According to another aspect of the present disclosure, there is provided a Unified Data Management, UDM, of a communication network that is configured to communicate with a Session Management Function, SMF, of the communication network. The UDM comprises a memory storing computer readable program code, and a processor connected to the memory to execute the computer readable program code to receive a subscription data request from the SMF for SM-related subscription data for a UE, and communicate a subscription data response indicating a home network preference related to a Radio Access Network, RAN, terminated User Plane, UP, data security for communications with the UE or decision on home network terminated UP data security for communications with the UE.

According to examples of the present disclosure, the processor may further execute the computer readable program code to perform the method of any preceding aspect or example of the present disclosure.

According to another aspect of the present disclosure, there is provided a Unified Data Management, UDM, of a communication network that is configured to communicate with a Session Management Function, SMF, of the communication network. The UDM performs operations comprising receiving a subscription data request from the SMF for SM-related subscription data for a UE, and communicating a subscription data response indicating a home network preference related to a Radio Access Network, RAN, terminated User Plane, UP, data security for communications with the UE or decision on home network terminated UP data security for communications with the UE.

According to examples of the present disclosure, the UDM may perform operations comprising the method of any preceding aspect or example of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
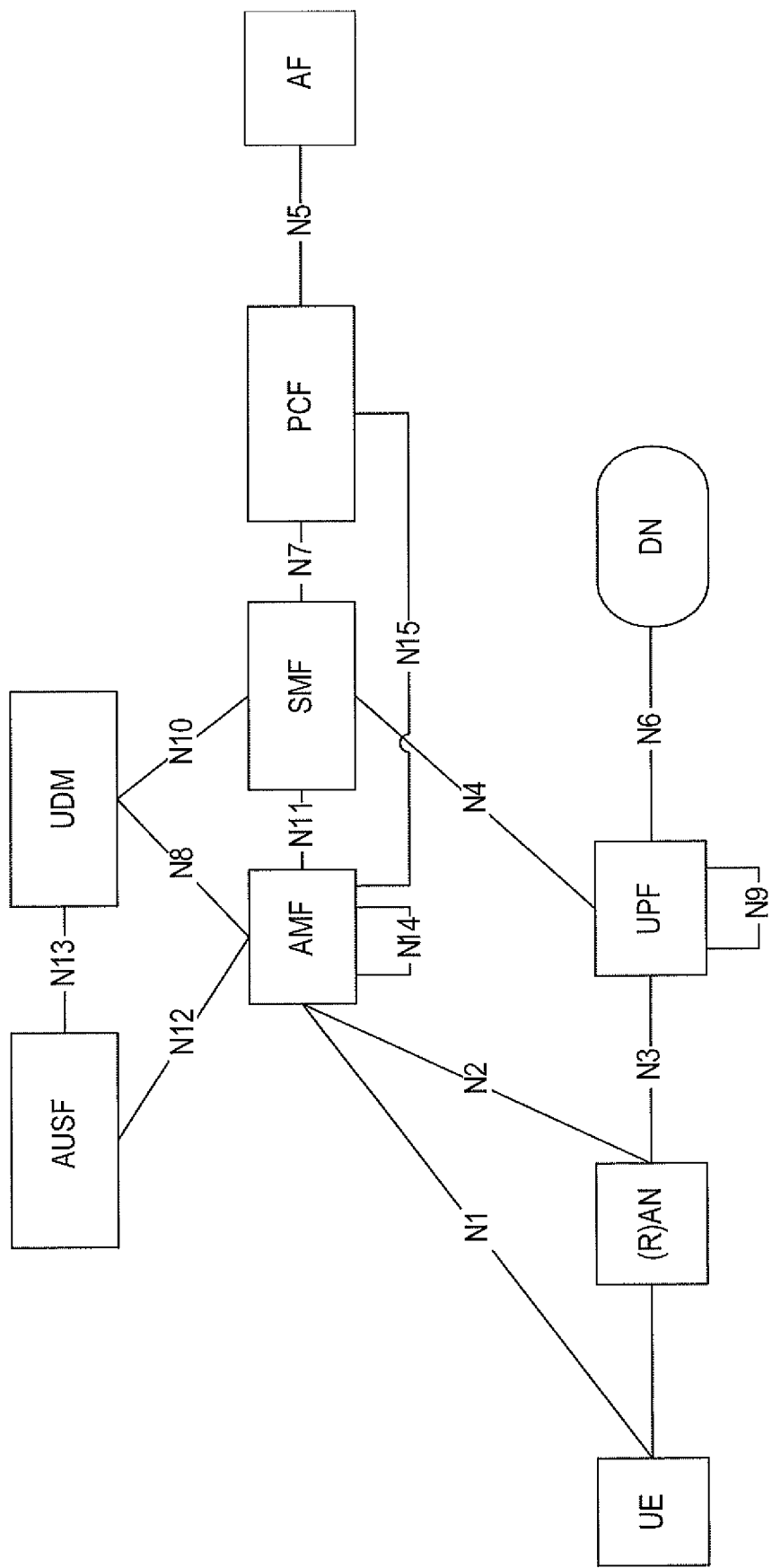
FIG. 1 is a block diagram of a non-roaming 5G system architecture in reference point representation.
Figure 2:
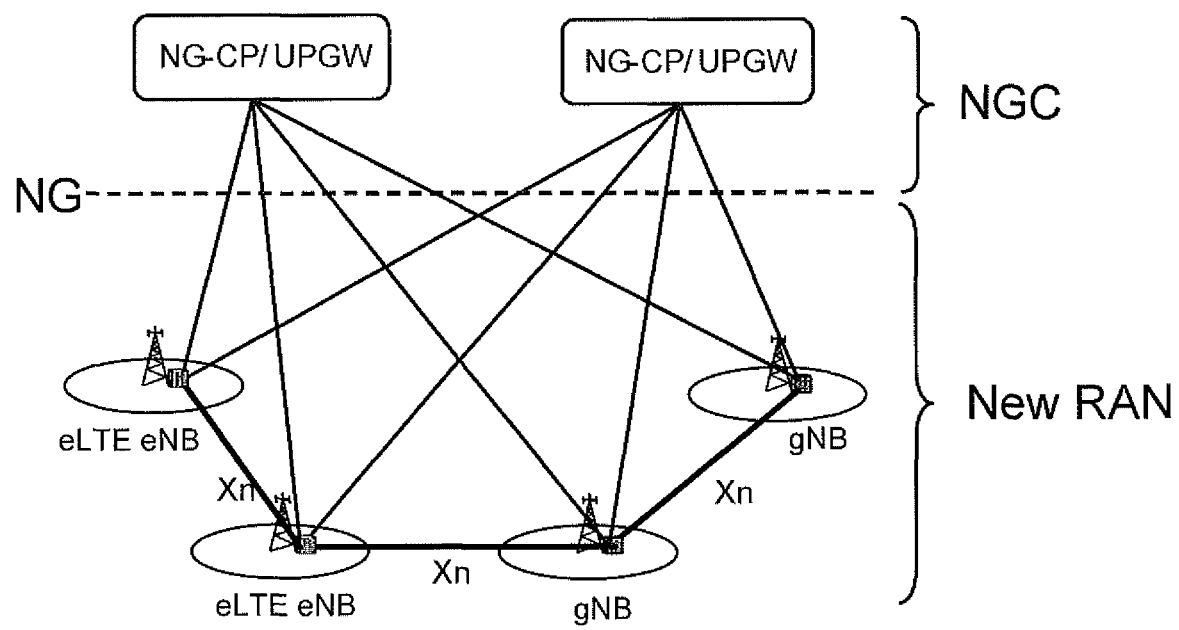
FIG. 2 illustrates a potential new RAN architecture for Next Generation networks.
Figure 3:
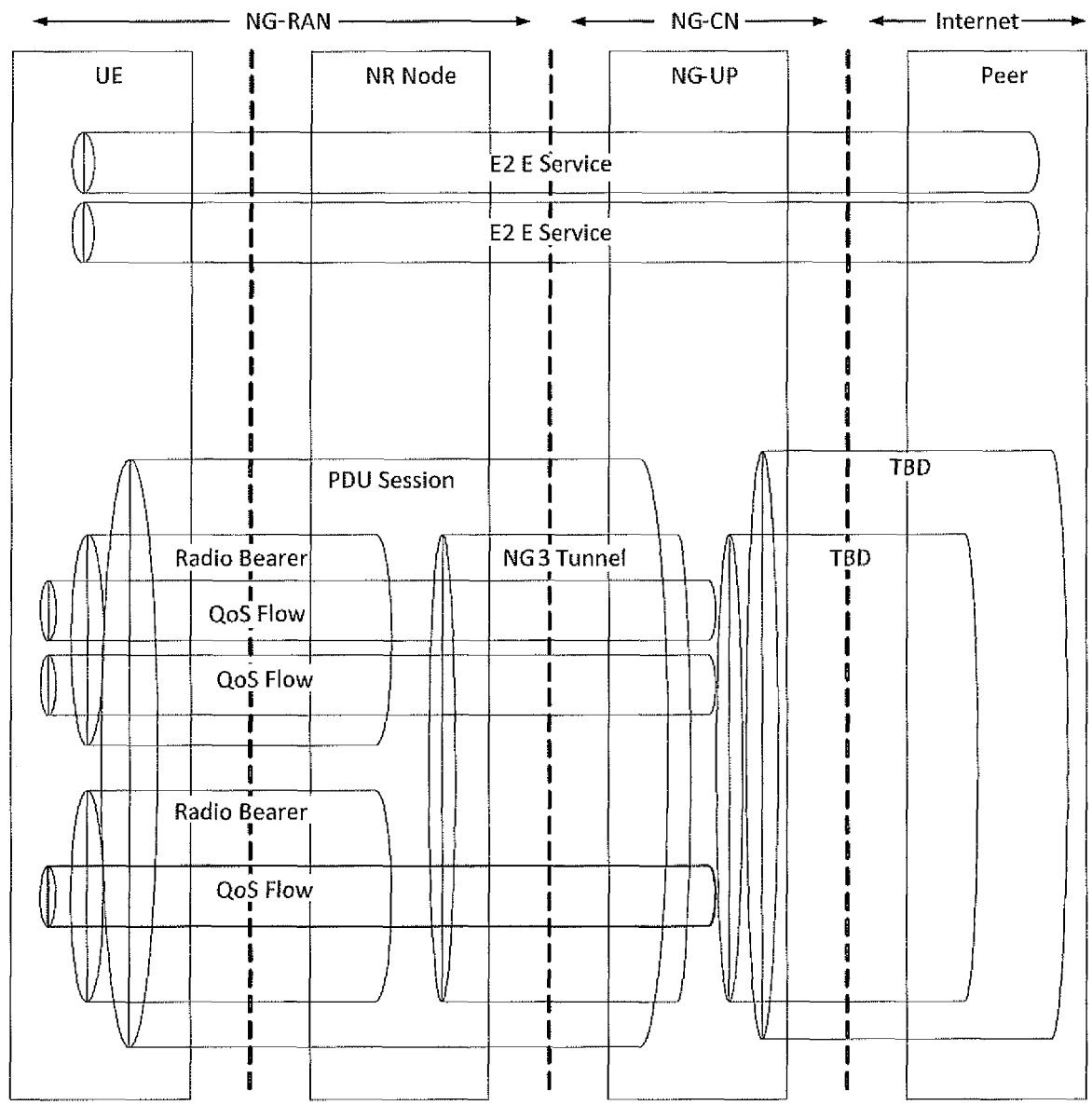
FIG. 3 illustrates a Quality of Service (QoS) architecture for NR and NextGen Core.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Some embodiments of the present disclosure are directed to providing operations and methods that enable provision and activation of a User Plane security policy, and may enable a core network to be informed as to when to switch on and switch off security in RAN or UPF residing in the core network. In some examples, the step wise introduction of Phase 1 and Phase 2 described above can be performed by operations and method through which a UE preference to use or not use User Plane (UP) encryption and/or UP integrity protection terminating in RAN per Slice ID/PDU Session ID pair is indicated to the core network.

For the sake of clarity, it is assumed that there is a protection layer supporting both integrity and encryption (or ciphering) for the User Plane (UP) between the UE and the RAN, i.e. the gNB. Whenever encryption or integrity is mentioned that is to mean respectively the encryption or the integrity protection feature in this protection layer. Currently in LTE that protection layer is realized by the PDCP protocol. It is expected that in Next Generation Systems, the same protection layer would be realized as well by possibly an enhanced version of the same protocol, i.e. PDCP.

This solution proposes a flexible way for the network to control the UP protection on the radio interface between the UE and the RAN. By control it is meant the activation or deactivation of either of integrity or encryption. The granularity of such a control can be at the level of a Network Slice, a Network Slice Level, or a PDU session. That is that the network applies the controls in a similar manner to all the Radio Bearer transporting the UP on a Network Slice-specific basis or even possibly on a PDU session-specific basis.

This control feature can be operationally implemented by a negotiation mechanism between the network and the UE where UE may indicate its preference to activate or deactivate encryption or integrity on a different granularity levels. That is per Network Slice or per PDU-session.

The UE's preferences may be stored in the UDM, i.e. included in the subscription information. They can be as well preconfigured in the UE. The home network may assist in the decision making by indicating to the serving network what controls are preferable and on which granularity level.

The visited network needs to make a policy decision if encryption and/or integrity terminating shall be used or not, based on the indication received from the home network, the UE preference if provided and the policy configured for the visited network (e.g. in the SMF). The core network can indicate to the UE in the NAS layer the outcome of such a decision.

The core network needs to inform the RAN whether encryption and/or integrity shall be used or not, per Slice ID or per PDU Session. This information is sent on N2 interface between the core network and the RAN.

The RAN can override such a decision or take own decision based on the UE's preference received from core network and possibly other information.

If the UE's preferences are not fulfilled, then the UE may take a responsive action. The action can be to connect to another gNB/eNB, or the UE can refrain from using a certain application.

When the UE is moving in the network, and changing the point of attached to the network (i.e. at mobility, handover or dual connectivity events), the UE preference, if provided, and network policy decision information need to be forwarded in the network side between the network nodes e.g. between two base-stations, or between to access management entities. Examples of such actions are:
- In handover event, the source access management entity (AMF) informs the target AMF.
- In Xn-handover between two base-stations, the source base-station needs to inform the target base-station whether to enable or disable encryption and/or integrity protection of UP possibly on a Network Slice/PDU session-specific basis. This information can be sent on the Xn interface from the source node to the target node.
- In dual connectivity between two base-stations, the master base-station needs to inform the secondary base-station per DRB whether to enable or disable encryption and/or integrity protection of UP. This information can be sent on the Xn interface from the master base-station to the secondary base-station.

Potential advantages that may be provided by one or more of the embodiments of the present disclosure include that the core network can switch on and switch off security termination of encryption and/or integrity protection per Slice ID/PDU Session ID in the RAN and the UE for UP data (sent between UE and RAN). Various associated operations that can be performed by one or more elements of the system can include: providing operations for who decides or is in control of whether security termination in RAN shall be switched on and off; configuring the UE to indicate its preference; configuring the UE to request and the network to accept the UE request; configuring the home network to apply a security policy; configuring the service network to modify based on based on its own policy setting; and configuring the RAN that have its own policy setting.

1.1 Baseline Variant Embodiment

It is assumed in the embodiment that the UE supports UP encryption terminating in RAN. It is assumed that the UE is not mandated to support integrity protection of UP data terminating in RAN. It is expected that the UE indicates in its security capability sent in NAS layer to core network (AMF) whether it supports integrity protection of UP data terminating in RAN or not, this may for example be indicated by the UE on registration with the communication network.

If it can be assumed that the UE is mandated to support integrity protection of UP data terminating in RAN, then the UE would not need to indicate whether it supports integrity protection of UP data terminating in RAN or not in its capability indication to the network.

As an option, the UE may have two different indications instead of one indication, for its preference to use encryption and integrity protection of UP data terminating in RAN or not.

1.1.1 Negotiation of Whether Integrity Protection and/or Encryption of UP Data Shall be Terminated in RAN or not Encryption of UP Data Terminated in RAN:

The UE and network needs to negotiate whether encryption of UP data shall be terminated in RAN or not.

It is assumed that the UE supports UP encryption termination in RAN. The UE may indicate its preference to use or not use UP encryption termination in RAN for a specific PDU Session ID. This indication can be applicable for all UP data i.e. all PDU sessions of all slice types, or the indication can be per slice type (e.g. Network Slice Selection Assistance Information, NSSAI) or per slice identifier (e.g. Data Network Name, DNN).

Integrity Protection of UP Data Terminated in RAN:

The UE and network needs to negotiate whether integrity protection of UP data shall be terminated in RAN or not.

The UE may indicate its support of UP integrity protection termination in RAN in its capability indication 'UE 5G security capability' to the network.

The UE may indicate its preference to use or not use UP integrity protection termination in RAN for a specific PDU Session ID. This indication can be applicable for all UP data, i.e., all PDU sessions of all slice types, or the indication can be per slice type (e.g. Network Slice Selection Assistance Information, NSSAI) or per slice identifier (e.g. Data Network Name, DNN).

UE security capabilities are indicated to the core network (AMF) in the Registration procedure.

Accordingly, in some examples, an indication transmitted by the UE may identify a UE preference whether to operate using security protection that comprises at least one of:
- encryption protection for UP data terminating in the RAN; and
- integrity protection for UP data terminating in the RAN.

In another example, an indication transmitted by the UE may identify a UE preference whether to operate using the security protection of UP data of communications in an identified PDU Session ID.

In another example, an indication transmitted by the UE may identify the UE preference whether to operate using the security protection for UP data of communications according to at least one of:
- all UP data exchanged with the RAN for all PDU sessions of all slice types; and
- all UP data exchanged with a specific slice type or with a specific slice identifier.

The transmitted indication may identify a Network Slice Selection Assistance Information (NSSAI) or a Data Network Name (DNN) to which the UE preference applies. The transmitted indication may comprise a UE 5G security capability indication transmitted by the UE to the communication network.

1.1.1 PDU Session Establishment (Generalized Variant Embodiment)

The activation or non-activation of UP encryption and/or UP integrity protection may be referred to as a UP security policy. The UP security policy for a PDU session may be provided to the RAN (for example to the gNB), by the SMF during the PDU session establishment procedure. The UP security policy may indicate whether UP encryption and/or UP integrity protection shall be activated or not for all DRBs belonging to that PDU session, and the UP security policy may be used to activate UP encryption and/or UP integrity protection for all DRBs belonging to that PDU session. The SMF may have a locally configured UP security policy, or may obtain a UP security policy, for example from a Unified Data Management (UDM) and/or from a Policy Control Function (PCF), for example if dynamic Policy and Charging Control (PCC) is deployed. The RAN (for example the gNB) may activate UP encryption and/or UP integrity protection per DRB according to the received UP security policy using RRC signaling, as discussed in further detail below.

Figure 4:
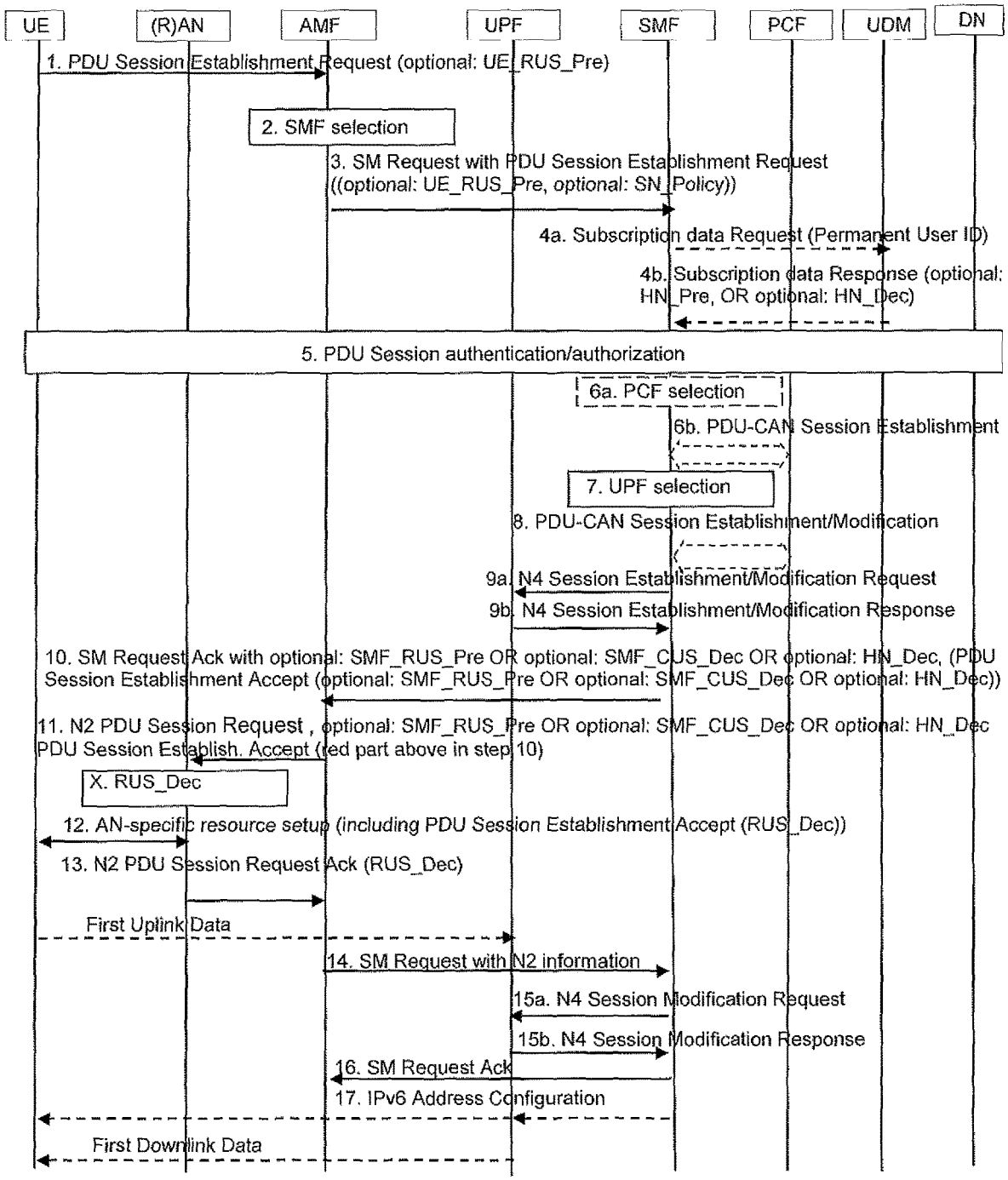
FIG. 4 is a combined flowchart and data flow diagram of a UE-requested PDU Session.

FIG. 4 is a combined flowchart and data flow diagram of a UE-requested PDU Session Establishment for non-roaming and roaming with local breakout. The operations and methods of FIG. 4 are a modification of a flow defined in TS 23.502 clause 4.3.2.2.

Figure 5:
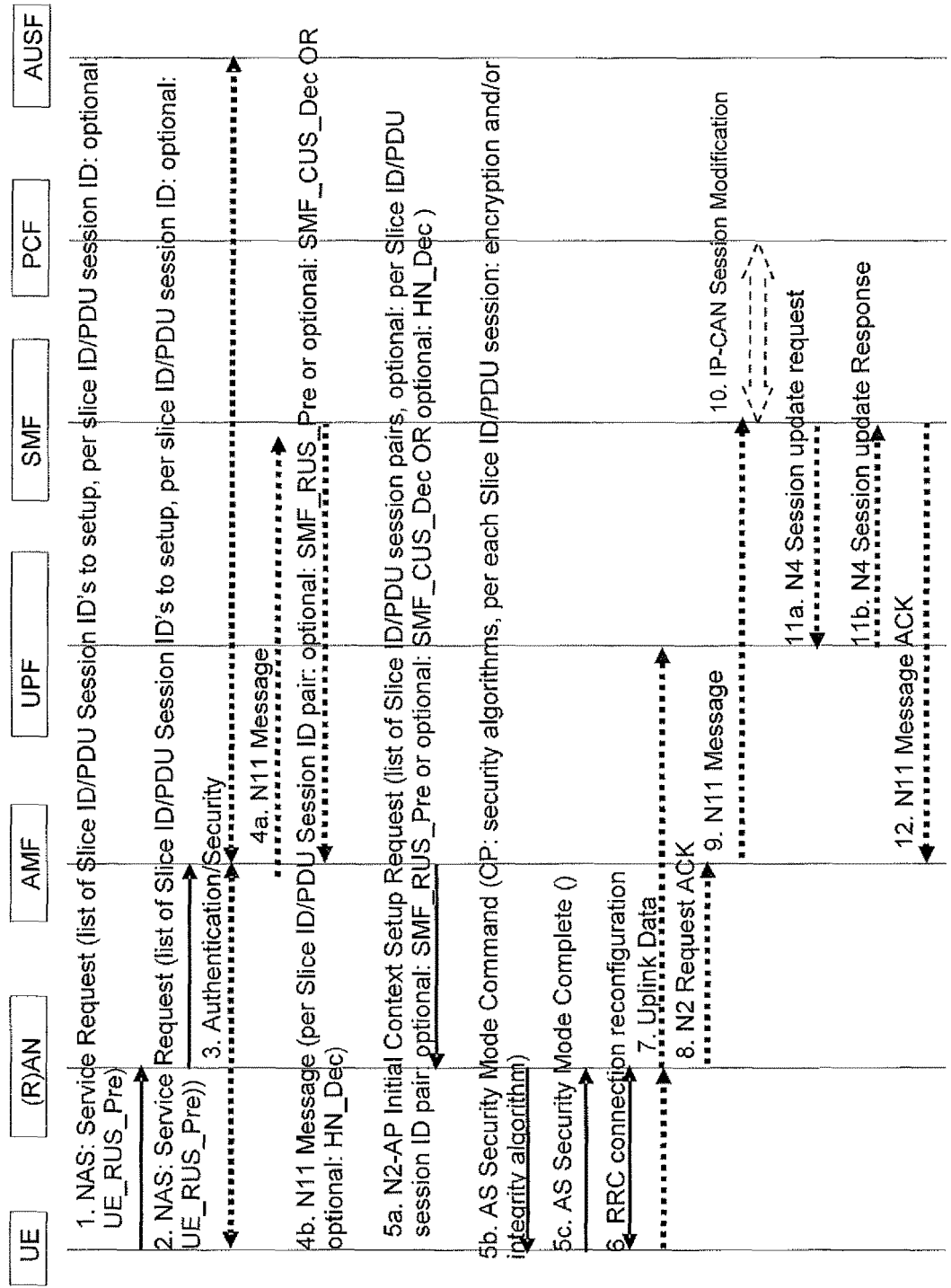
FIG. 5 is a combined flowchart and data flow diagram of a UE triggered Service Request Procedure Establishment.
Figure 6:
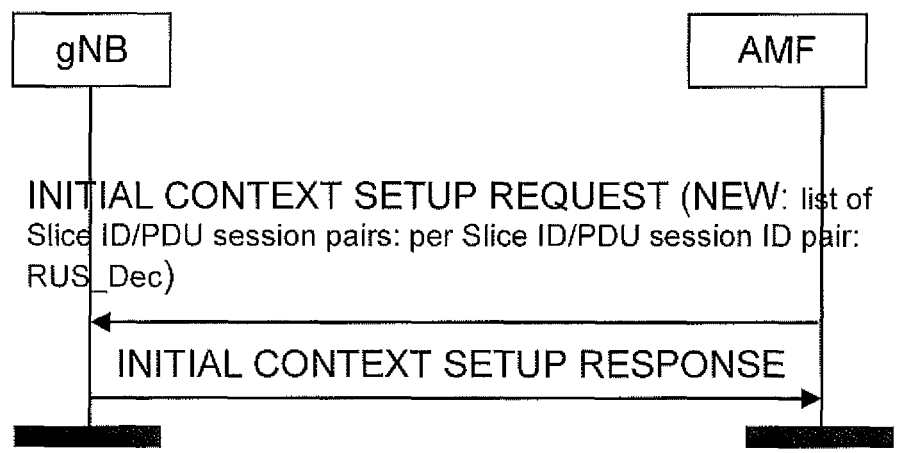
FIG. 6 is a data flow diagram of messages between a gNB and an Access and Management Function (AMF).

The following abbreviations are used in FIGS. 4, 5, and elsewhere herein:

RUS_Pre: The preference of RAN UP security
UE_RUS_Pre: The preference of the UE on RAN UP security
SMF_RUS_Pre: The preference of session management entity on RAN UP security
HN_Pre: The preference of home network on UP security. This preference may indicate termination of UP security in RAN or in CN in the serving network.
HN_Dec: The decision of home network on home terminated UP security
SN_Policy: The serving network may have policy rules related to the negotiation, and the UP security policy used as a default in RAN.
RUS_Dec: The decision of RAN UP security made by RAN.
CUS_Dec: The decision of CN UP security termination.

The operations and methods illustrated in FIG. 4 are performed after the UE has already registered on the AMF, and thus the AMF has already retrieved the user subscription data from the UDM.

The operations and methods corresponding to the 17 enumerated steps (i.e., STEP 1 to STEP 17) illustrated in FIG. 4 are explained below.

STEP 1—from UE to AMF: PDU Session Establishment Request (Optional: UE_RUS_Pre)

The sends a PDU Session Establishment Request message and optionally indicates its preference of RAN user plane security. The indicated preference may indicate one or more of:

UE_RUS_Pre: use/use not encryption of UP data terminating in RAN, and
UE_RUS_Pre: use/use not integrity protection of UP data terminating in RAN.

For example, if the UE supports an IoT slice type, then the UE can indicate for that IoT slice type its preference whether to use encryption or integrity protection or both of UP data terminating in RAN or not for, this particular PDU Session ID. Or if the UE is authorized to access data network A (slice identifier), then the UE can indicate for that slice identifier its preference to use encryption or integrity protection or both for UP data terminated in RAN. Alternatively, if the UE is an IoT UE, then the UE can indicate that all UP data is preferred to use both encryption and integrity protection for UP data terminated in RAN.

Figure 9A:
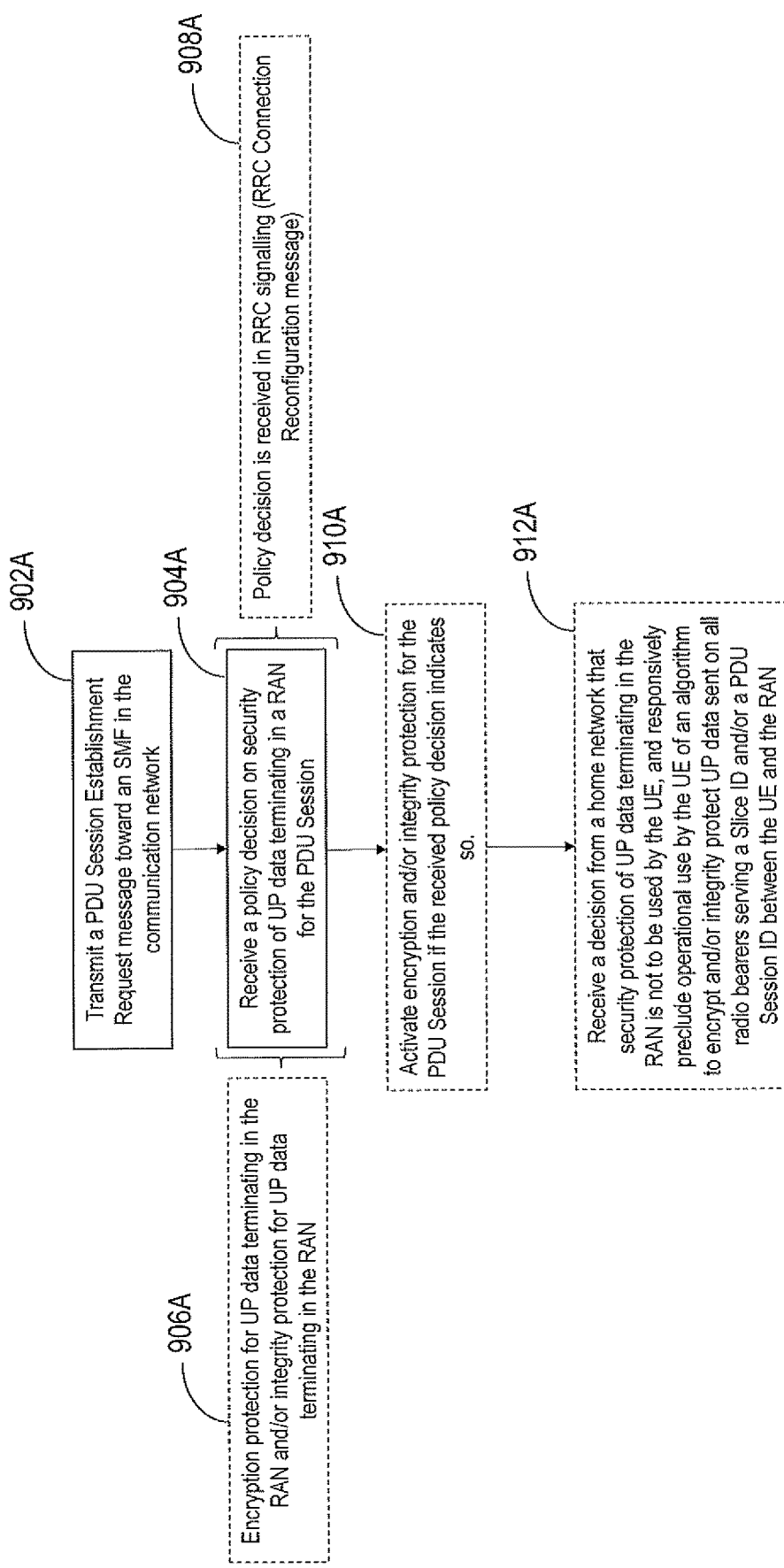
FIGS. 9A and 9B are flowcharts of operations and methods that can be performed by a UE in accordance with some examples of the present disclosure.
Figure 9B:
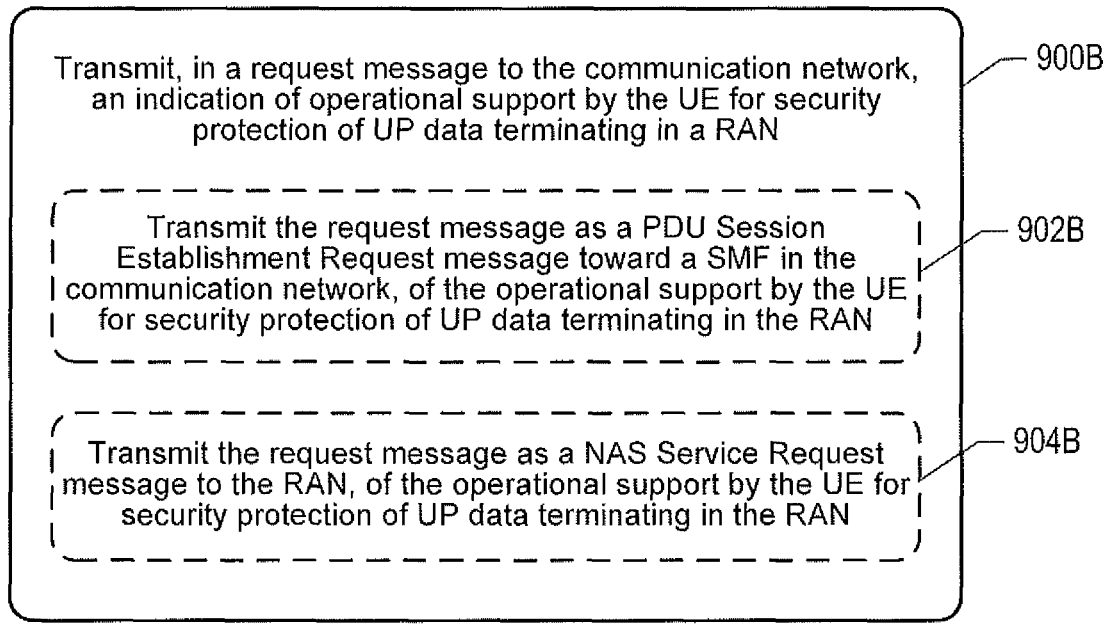

FIGS. 9A and 9B are flowcharts of operations and methods that can be performed by a UE in accordance with some examples of the present disclosure. Referring to FIG. 9A, the UE transmits (block 902A) a PDU Session Establishment Request message toward an SMF of the communication network. As illustrated in FIG. 9B, the UE may transmit (block 900B), in a request message to the communication network, an indication of operational support by the UE for security protection of UP data terminating in a RAN.

In a further example, the UE may transmit (902B) the request message as a PDU Session Establishment Request message toward the SMF in the communication network, of the operational support by the UE for security protection of UP data terminating in the RAN.

Figure 10A:
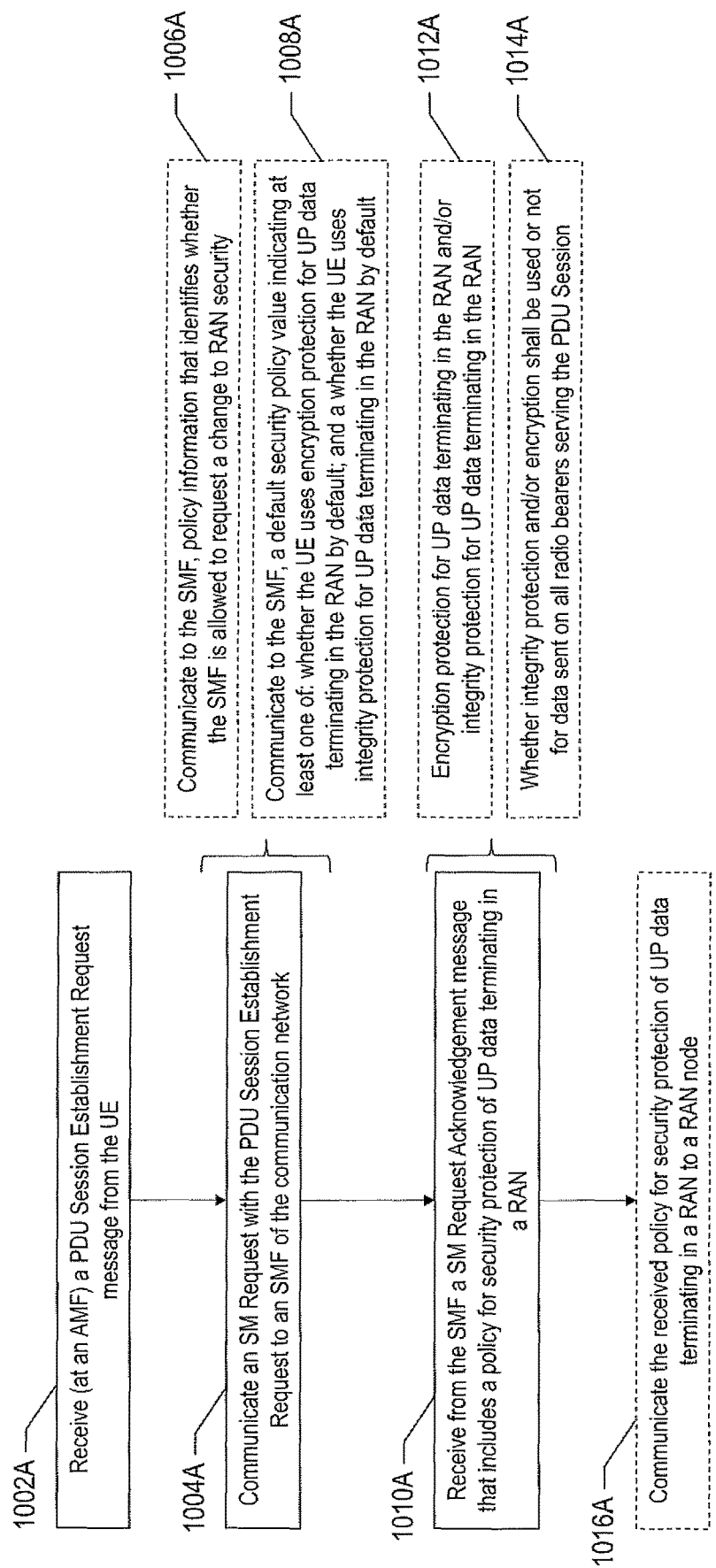
FIGS. 10A, 10B and 10C are flowcharts of operations and methods that can be performed by a network node of the communication network in accordance with some examples of the present disclosure.
Figure 10B:
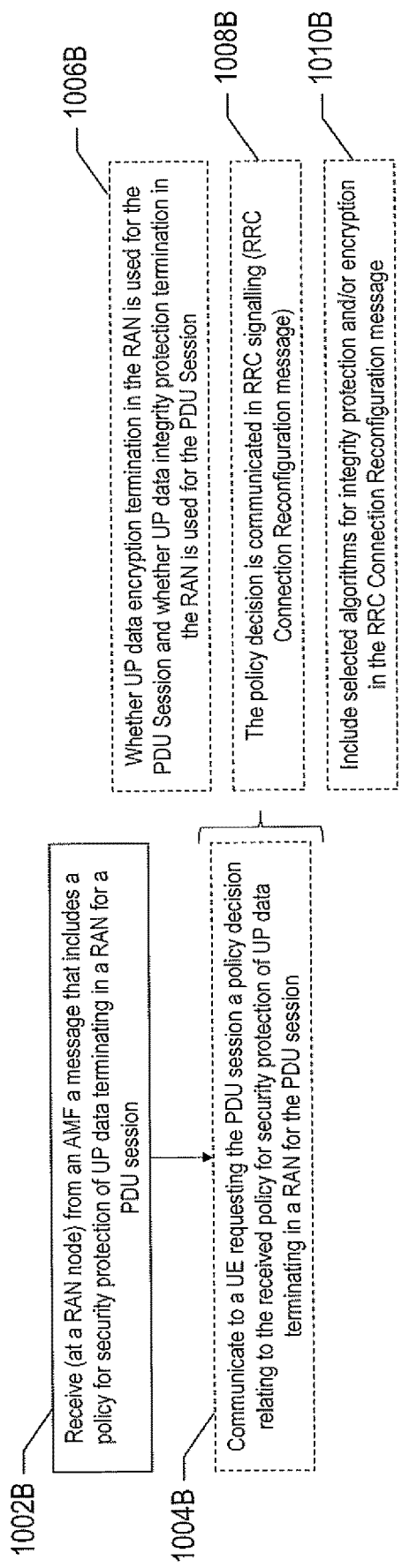
Figure 10C:
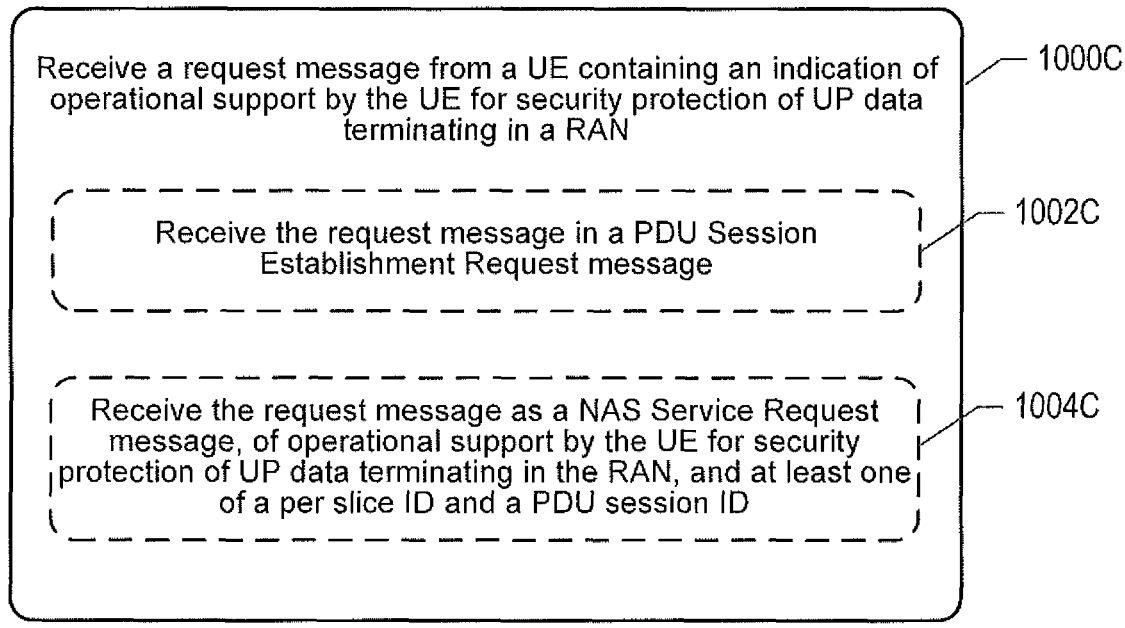

FIGS. 10A, 10B and 10C are flowcharts of operations and methods that can be performed by a network node of the communication network in accordance with some examples of the present disclosure. Referring to FIG. 10A, the network node, for example an AMF of the communication network, receives (at block 1002A) a PDU Session Establishment Request message from the UE. As illustrated in FIG. 10C, the network node (for example an AMF) may receive (at block 1000C) a request message from the UE containing an indication of operational support by the UE for security protection of UP data terminating in a Radio Access Network, RAN.

In a further example, the request message is received (1002C) in a PDU Session Establishment Request message. The network node may be a AMF, which forwards the indication to a SMF of the communication network.

In some further examples, the indication received by the network node identifies a UE preference whether to operate using security protection that comprises at least one of:
encryption protection for UP data terminating in the RAN; and
integrity protection for UP data terminating in the RAN.

The indication received by the network node may identify a UE preference whether to operate using the security protection of UP data of communications in an identified PDU Session ID. The indication received by the network node may identify the UE preference whether to operate using the security protection for UP data of communications according to at least one of:
all UP data exchanged with the RAN for all PDU sessions of all slice types; and
all UP data exchanged with a specific slice type or with a specific slice identifier.

The indication received by the network node may identify a NSSAI or a DNN to which the UE preference applies. The indication received by the network node may be a UE 5G security capability indication transmitted by the UE to the network node.

STEP 2:

Referring again to FIG. 4, the AMF determines that the message corresponds to a request for a new PDU Session based on the PDU Session ID that is not used for any existing PDU Session(s) of the UE. The AMF selects an SMF as described in TS 23.501 [2], clause 6.3.2.

STEP 3—From AMF to SMF:

The AMF communicates to the SMF a SM Request with PDU Session Establishment Request, which may include one or more of: UE_RUS_Pre, and SN_Policy. This is illustrated at block 1004A of FIG. 10A, in which the network node (for example the AMF) communicates an SM Request with the PDU Session Establishment Request to an SMF of the communication network. The network node may additionally communicate to the SMF policy information that identifies whether the SMF is allowed to request a change to RAN security (block 1006A) and/or the network node may communicate to the SMF a default security policy value indicating at least one of: whether the UE uses encryption protection for UP data terminating in the RAN by default;

and whether the UE uses integrity protection for UP data terminating in the RAN by default (block 1008A).

The AMF may forward the UE preference to SMF. As discussed above, the AMF may add policy information to the message that indicates one or more of:

SN_policy: the AMF can indicate to SMF the policy information if SMF is allowed to request change to RAN security, and SN_policy: AMF can also indicate the default security policy values to SMF (e.g. RAN encryption is used, RAN integrity is not used).

Accordingly, in some further embodiments, the indication may be communicated to the SMF with policy information that identifies whether the SMF is allowed to request a change to RAN security. The communication from the AMF to the SMF may include a default security policy value indicating at least one of: whether the UE uses encryption protection for UP data terminating in the RAN by default; and whether the UE uses integrity protection for UP data terminating in the RAN by default.

STEP 4a—SMF to UDM:

The SMF communicates to the UDM a Subscription Data Request, which can include Subscriber Permanent ID and DNN.

The SMF may have a common local policy which applies to all UEs accessing to the network slice related to the termination of UP security. In this case, the policy information may not be needed from UDM. If there is no common local policy, and the SMF has not yet retrieved the SM-related subscription data for the UE related with the DNN, the SMF requests this subscription data.

Figure 11A:
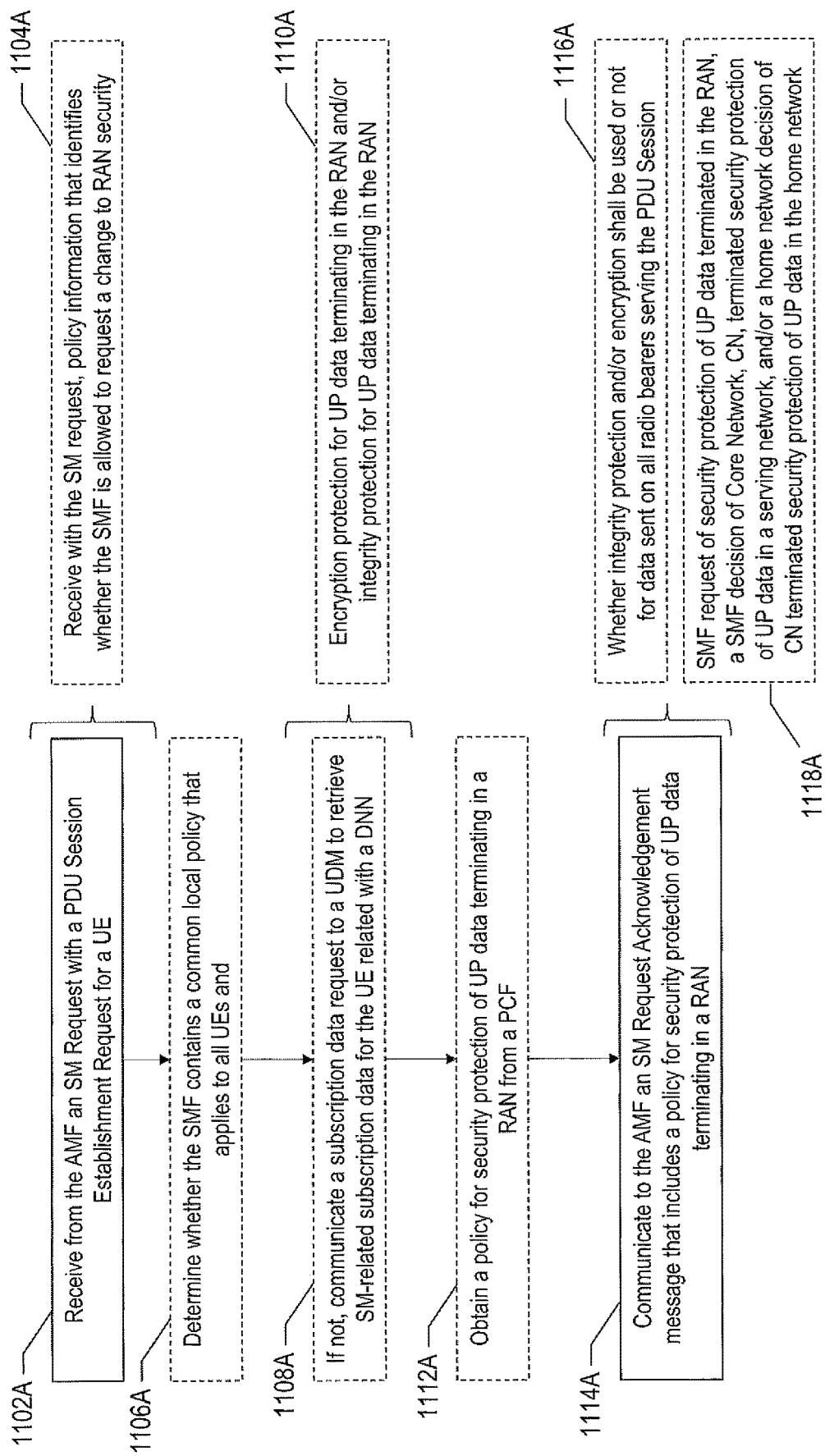
FIGS. 11A and 11B are flowcharts of operations and methods for operating a Session Management Function (SMF) of a communication network.
Figure 11B:
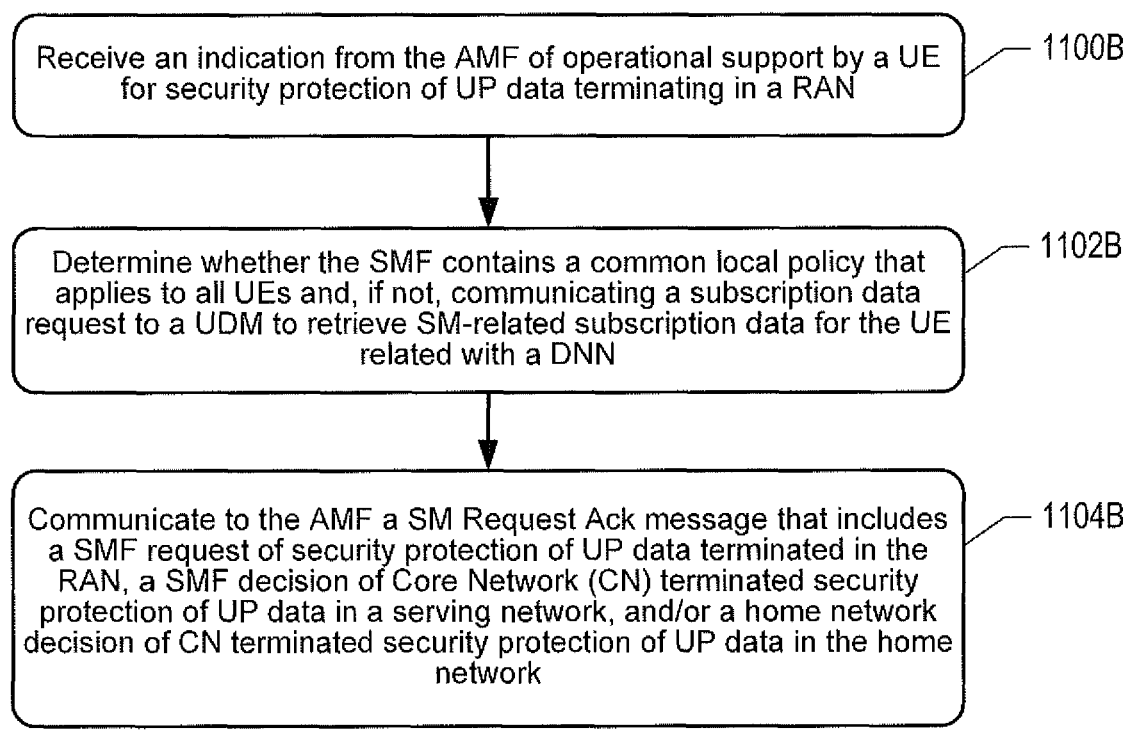

FIGS. 11A and 11B are flowcharts of operations and methods for operating a SMF of a communication network that is configured to communicate with a AMF of the communication network. Referring to FIG. 11A, the SMF receives from the AMF an SM Request with a PDU Session Establishment Request for a UE (block 1102A). The SMF may receive with the SM request, policy information that identifies whether the SMF is allowed to request a change to RAN security (block 1104A). As illustrated in FIG. 11B, the SMF may receive (block 1100B) an indication from the AMF of operational support by a UE for security protection of UP data terminating in the RAN. In some further embodiments, the SMF may receive with the indication, policy information that identifies whether the SMF is allowed to request a change to RAN security.

As illustrated in FIGS. 11A and 11B, the SMF may respond to the receipt of the message by determining (block 1106A, or 1102B) whether the SMF contains a common local policy that applies to all UEs and, if not, communicating a subscription data request to a Unified Data Management, UDM, to retrieve SM-related subscription data for the UE related with a Data Network Name, DNN (block 1108A). The retrieved SM-related subscription data for the UE may identify whether to operate using security protection that comprises at least one of:

encryption protection for UP data terminating in the RAN; and integrity protection for UP data terminating in the RAN (block 1110A of FIG. 11A).

STEP 4b—UDM to SMF:

The UDM communicates to the SMF a Subscription Data Response, which may include one or more of: HN_Pre, and HN_Dec.

The UDM may indicate to SMF the home network preference related to the RAN terminated UP security or decision on home network terminated UP security. The home network preference (HN_Pre) may be specific to RAN UP security, e.g., which may include one or more of:

The UDM indicates in its subscription data whether UP encryption terminating in RAN should be used or must not be used or whether it's indifferent, and The UDM indicates in its subscription data whether UP integrity protection terminating in RAN should be used or must not be used or whether it's indifferent.

The home network preference (HN_Pre) may also be specific to CN termination of UP, e.g., Optional: The UDM indicates that the UP encryption and/or UP integrity protection should be terminated in the CN in the serving network.

The home network decision (HN_Dec) is specific to home network termination of UP security, e.g.

Optional: The UDM indicates that the UP encryption and/or UP integrity protection should be terminated in the CN in the home network.

Figure 12A:
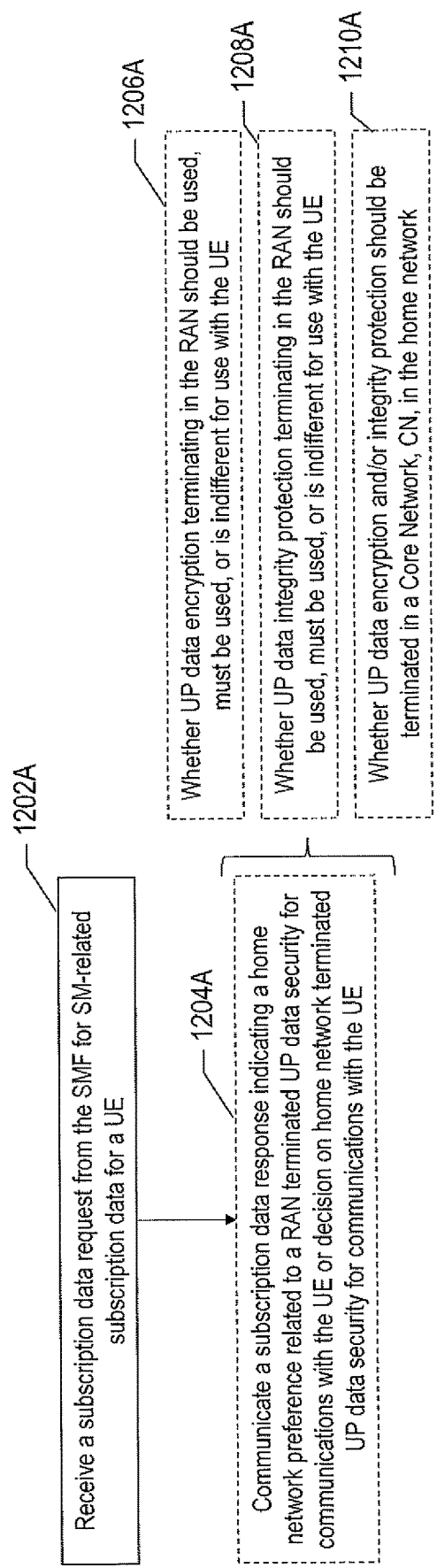
FIGS. 12A and 12B are flowcharts of operations and methods for operating a Unified Data Management (UDM) of a communication network.
Figure 12B:
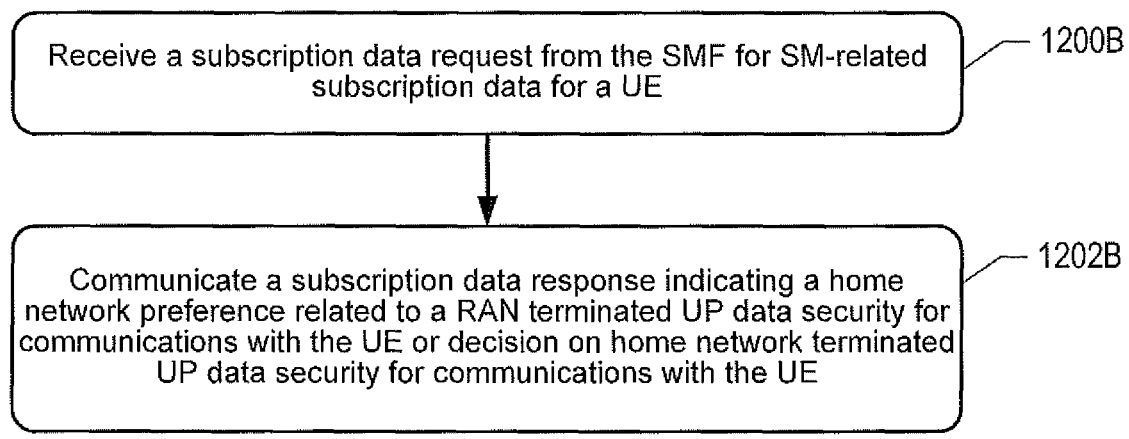

FIGS. 12A and 12B are flowcharts of operations and methods for operating the UDM of a communication network that is configured to communicate with the SMF. The UDM receives (block 1202A of FIG. 12A or block 1200B of FIG. 12B) a subscription data request from the SMF for SM-related subscription data for a UE, and communicates (block 1204A of FIG. 12A and block 1202B of FIG. 12B) a subscription data response indicating a home network preference related to the RAN terminated UP data security for communications with the UE or decision on home network terminated UP data security for communications with the UE.

The subscription data response may indicate whether UP data encryption terminating in the RAN should be used, must be used, or is indifferent for use with the UE (block 1206A of FIG. 12A). The subscription data response may alternatively indicate whether UP data integrity protection terminating in the RAN should be used, must be used, or is indifferent for use with the UE (block 1208A). The subscription data response may still alternatively indicate whether UP data encryption and/or integrity protection should be terminated in a Core Network, CN, in the home network (block 1210A).

STEP 5—SMF to DN Via UPF:

If the SMF needs to authorize/authenticate the establishment of the PDU session as described in clause 5.6.6 of TS 23.501 [2], the SMF selects an UPF as described in TS 23.501 [2] clause 6.3.3 and triggers the PDU session establishment authentication/authorization as described in section 4.3.2.X.

If the PDU session establishment authentication/authorization fails, the SMF terminates the PDU session establishment procedure and indicates a rejection to the UE.

STEP 6a:

If dynamic PCC is deployed, the SMF performs PCF selection.

STEP 6b:

The SMF may initiate PDU-CAN Session Establishment towards the PCF to get the default PCC Rules for the PDU Session. In some examples, the SMF may also obtain UP security policy for the PDU session from the PCF (block 1112A of FIG. 11A). This may be in addition to or as an alternative to UP security policy obtained in subscription information from the UDM. For example, the UP security policy may be obtained from PCC policy downloaded from the PCF as part of dynamic PCC.

STEP 7:

The SMF selects an SSC mode for the PDU Session.

STEP 8:

If dynamic PCC is deployed and the PDU-CAN Session Establishment was not done in step 5, the SMF initiate PDU-CAN Session Establishment towards the PCF to get the default PCC Rules for the PDU Session. As discussed above, in some examples, the SMF may also obtain UP security policy for the PDU session from the PCF. This may be in addition to or as an alternative to UP security policy obtained in subscription information from the UDM. For example, the UP security policy may be obtained from PCC policy downloaded from the PCF as part of dynamic PCC.

STEP 9:

If STEP 5 was not performed, the SMF initiates an N4 Session Establishment procedure with the selected UPF, otherwise it initiates an N4 Session Modification procedure with the selected UPF:

STEP 9a. The SMF sends an N4 Session Establishment/Modification Request to the UPF and provides Packet detection, enforcement and reporting rules to be installed on the UPF for this PDU Session.

STEP 9b. The UPF acknowledges by sending an N4 Session Establishment/Modification Response.

STEP 10—SMF to AMF:

The SMF communicates to the AMF a SM Request Ack, which includes a policy for security protection of UP data terminating in a RAN and may optionally include one or more of:

UE_RUS_Pre;
SMF_RUS_Pre;
SMF_CUS_Dec;
HN_Dec; and
PDU Session Establishment Accept (optionally including: SMF_RUS_Pre, SMF_CUS_Dec, and/or HN_Dec))

Referring again to FIGS. 11A and 11B, the SMF communicates to the AMF an SM Request Acknowledgement message that includes a policy for security protection of UP data terminating in a RAN (block 1114A of FIG. 11A). The policy may indicate whether integrity protection and/or encryption shall be used or not for data sent on all radio bearers serving the PDU Session (block 1116A). Receipt of this message at the AMF is illustrated at block 1010A of FIG. 10A. The SM Request Ack message received at the AMF may include an indication whether encryption protection for UP data terminating in the RAN and/or integrity protection for UP data terminating in the RAN is to be used (block 1012A) and/or whether integrity protection and/or encryption shall be used or not for data sent on all radio bearers serving the PDU Session (block 1014A).

The SM Request Ack message may include the SMF request of RAN UP security (SMF_RUS_Pre), or SMF decision of CN terminated security of UP in the serving network (SMF_CUS_Dec), or HN decision of CN terminated security of UP in the home network (HN_Dec).

As illustrated in FIGS. 11A and 11B, the SMF may operate to communicate (1118A and 1104B) to the AMF a SM Request Ack message that includes a SMF request of security protection of UP data terminated in the RAN, a SMF decision of Core Network (CN) terminated security protection of UP data in a serving network, and/or a home network decision of CN terminated security protection of UP data in the home network.

STEP 11—AMF to (R)AN:

Referring again to FIG. 10A, the network node (for example the AMF) communicates the received policy for security protection of UP data terminating in a RAN to a RAN node. As illustrated in FIG. 10B, this communication may be received at a RAN node in step 1002B.

As illustrated in FIG. 4, the AMF communicates to the RAN a N2 PDU Session Request, which may include one or more of: SMF_RUS_Pre, SMF_CUS_Dec, HN_Dec, PDU Session Establish, Accept, SMF_RUS_Pre, SMF_CUS_Dec, and HN_Dec.

The information from message 10 is forwarded to RAN.

An additional step that may be performed between Step 11 above and Step 12 below, includes the (R)AN operating to make the policy decision related to security for UP terminated in RAN. The RAN considers all information provided to it, which can include one or more of:

The local policy of RAN related to security of UP terminated in RAN.
UE_RUS_Pre
SMF_RUS_Pre
SMF_CUS_Dec
HN_Dec STEP 12—(R)AN to UE:

The RAN communicates to the UE a AN-specific resource setup, which may include PDU Session Establishment Accept and/or RUS_Dec.

The (R)AN indicates the policy decision to UE. This is illustrated in block 1004B of FIG. 10B, in which the RAN node communicates to the UE requesting the PDU session a policy decision relating to the received policy for security protection of UP data terminating in a RAN for the PDU session. The policy decision may include whether UP data encryption termination in the RAN is used for the PDU Session and whether UP data integrity protection termination in the RAN is used for the PDU Session as illustrated in block 1006B. The policy decision may be communicated in RRC signaling (for example in an RRC Connection Reconfiguration message) as illustrated at block 1008B. The RAN node may include selected algorithms for integrity protection and/or encryption in the RRC Connection Reconfiguration message as illustrated in block 1010B. Referring again to FIG. 4, if (R)AN activates encryption and/or integrity protection for this PDU Session ID/Slice ID between UE and (R)AN, then the (R)AN may do so using RRC signaling, for example, the (R)AN may indicate the selected algorithms for integrity protection and/or encryption of UP data sent on all the radio bearers serving this PDU Session ID in the RRC Connection Reconfiguration message to the UE. The RRC Connection Reconfiguration message is integrity protected.

Referring again to FIG. 9A, the UE receives a policy decision on security protection of UP data terminating in a RAN for the PDU Session in block 904A. As discussed above, this may be received in RRC signaling, for example in an RRC Connection Reconfiguration Message (block 908A). The policy decision may indicate whether to operate using security protection that comprises at least one of encryption protection for UP data terminating in the RAN and integrity protection for UP data terminating in the RAN (block 906A). The UE may then activate encryption and/or integrity protection for the PDU Session if the received policy decision indicates so (block 910A). The UE may receive a decision from a home network that security protection of UP data terminating in the RAN is not to be used by the UE, and may responsively preclude operational use by the UE of an algorithm to encrypt and/or integrity protect UP data sent on all radio bearers serving a Slice ID and/or a PDU Session ID between the UE and the RAN (block 912A)

Accordingly, the RAN or other network node can be configured to respond to activating operational use of at least one of: encryption protection for UP data terminating in the RAN, and integrity protection for UP data terminating in the RAN, by selecting one or more algorithms used for the encryption protection and/or the integrity protection that is activated for operational use. The RAN or other network node can then use the one or more algorithms to encrypt and/or integrity protect UP data sent on all radio bearers serving a PDU Session ID in a Radio Resource Control, RRC, Connection Reconfiguration message to the UE.

In some embodiments, the UE may correspondingly, select one or more algorithms supported by the UE for use for the encryption protection and/or the integrity protection that is activated for operational use, responsive to activating operational use of at least one of: encryption protection for UP data terminating in the RAN; and integrity protection for UP data terminating in the RAN, and use the one or more algorithms to encrypt and/or integrity protect UP data sent on all radio bearers serving a Slice ID and/or a PDU Session ID between the UE and the RAN.

One of more of following additional sub-steps may optionally be performed:

Optional: The UE stores the preference or indication regarding whether UP encryption terminating shall be used in RAN or not, received in PDU Session Establishment Accept message for this PDU Session ID/Slice ID.

Optional. The UE stores the preference or indication regarding whether UP integrity protection terminating shall be used in RAN or not, received in PDU Session Establishment Accept message for this PDU Session ID/Slice ID.

Optional. The UE may activate encryption and/or integrity protection for this PDU Session ID between UE and (R)AN if the preference or indications received in PDU Session Establishment Accept message indicates so.

Optional. The UE is taking the selected algorithms for integrity protection and/or encryption received in the RRC Connection Reconfiguration message from the (R)AN into use. The (R)AN may have a different preference and not follow the preference sent in PDU Session Establishment Accept message to the UE.

Optional. The UE can now send encrypted and/or integrity protected UP data for this PDU Session ID/Slice ID.

STEP 13—(R)AN to AMF:

The RAN communicates to the AMF a N2 PDU Session Request Ack and/or a RUS_Dec.

RAN indicates the policy decision to AMF. The (R)AN indicates to AMF and SMF whether UP encryption termination in RAN is taken into use for this PDU Session ID. The (R)AN indicates to AMF and SMF whether UP integrity protection termination in RAN is taken into use for this PDU Session ID. The AMF may store the policy decision received from the RAN for the particular PDU Session ID.

Accordingly, the RAN or other network node can communicate to the AMF a policy decision indicating at least one of: whether UP data encryption termination in the RAN is used for the PDU Session ID; and whether UP data integrity protection termination in the RAN is used for the PDU Session ID.

According to some examples of the present disclosure, the (R)AN may not overrule the UP security policy provided by the SMF (via the AMF). If the (R)AN cannot activate UP confidentiality and/or UP integrity protection according to the received UP security policy, the (R)AN may reject establishment of UP resources for the PDU session.

STEP 14—AMF to SMF:

The AMF communicates to the SMF a SM Request and/or N2 SM information.

The AMF forwards the N2 SM information received from (R)AN to the SMF. A further optional operation includes that the AMF indicates the policy decision to the SMF.

STEP 15a:

If the N4 session for this PDU Session was not established already, the SMF initiates an N4 Session Establishment procedure with the UPF. The SMF may forward the policy decision received from the RAN via the AMF to the UPF.

STEP 15b:

15b. The UPF provides a N4 Session Establishment/Modification Response to the SMF.

STEP 16:

After this step, the AMF forwards relevant events to the SMF, e.g. at handover where the (R)AN Tunnel Info changes or the AMF is relocated.

STEP 17: SMF to UE, via UPF

In case of PDU Type IPv6, the SMF generates an IPv6 Router Advertisement and sends it to the UE via N4 and the UPF.

1.1.2 UE Triggered Service Request in CM-IDLE State

FIG. 5 is a combined flowchart and data flow diagram of a UE triggered Service Request procedure. The operations and methods of FIG. 5 are a modification of a flow defined in TS 23.502 clause 4.3.3.3.

Two different optional examples (Option 1 and Option 2) of the operations and methods are described where the RAN indicate to UE how to establish and setup UP security for radio bearers serving the same PDU Session ID. Option 2 may be a preferable approach.

The operations and methods corresponding to the 12 enumerated steps (i.e., STEP 1 to STEP 12) illustrated in FIG. 5 are explained below.

STEP 1: UE to (R)AN

A MM Non-Access-Stratus (NAS) Service Request message is transmitted from the UE to the RAN. The NAS Service Request can include PDU session ID(s), security parameters, PDU session status, and per slice ID/PDU session ID, and may optionally include UE_Rus_Pre. An optional step includes the UE indicating its UE_Rus_Pre per PDU Session ID.

Referring again to FIG. 9B, in one further example, the UE transmits (904B) the request message as a Non-Access-Stratus (NAS) Service Request message to the RAN, of the operational support by the UE for security protection of UP data terminating in the RAN.

In a further example, the transmitted indication identifies a UE preference whether to operate using security protection that comprises at least one of:

encryption protection for UP data terminating in the RAN; and integrity protection for UP data terminating in the RAN.

In another further embodiment, the transmitted indication identifies a UE preference whether to operate using the security protection of UP data of communications in an identified PDU Session ID.

In another further example, the transmitted indication identifies the UE preference whether to operate using the security protection for UP data of communications according to at least one of:

all UP data exchanged with the RAN for all PDU sessions of all slice types; and all UP data exchanged with a specific slice type or with a specific slice identifier.

Referring again to FIG. 10C, the network node may be RAN, and can be operated to receive (1004C) the request message as a NAS Service Request message, of operational support by the UE for security protection of UP data terminating in the RAN, and at least one of a per slice ID and a PDU session ID.

STEP 2: (R)AN to AMF

The RAN communicates to the AMF a N2 Message including MM NAS Service Request, which can include PDU session ID(s), security parameters, PDU session status, per slice ID/PDU session ID, and may optionally include UE_Rus_Pre. The N2 Message may include a 5G Temporary ID, Location information, RAT type, and RRC establishment cause.

Accordingly, in one embodiment, responsive to receiving (1004C) the NAS Service Request message, the network node, which can be the RAN, communicates to the AMF the indication and at least one of the per slice ID and the PDU session ID.

STEP 3

If the Service Request was not sent integrity protected or integrity protection is indicated as failed, the AMF shall initiate NAS authentication/security procedure as defined in clause 4.6.

STEP 4a: [Conditional] AMF to SMF:

The AMF communicates to the SMF a N11 Message and/or a PDU session ID(s).

If the MM NAS Service Request message includes PDU session ID(s), or this procedure is triggered by SMF but PDU session IDs from UE correlates to other SMFs than the one triggering the procedure, the AMF sends N11 message to SMF(s) associated with the PDU session ID(s).

STEP 4b: [Conditional] SMF to AMF:

The SMF communicates to the AMF the N11 Message per Slice ID/PDU Session ID pair. The N11 message may optionally include one or more of the following: SMF_RUS_Pre, SMF_CUS_Dec, HN_Dec, N2 SM information, QoS profile, CN N3 Tunnel Info, per Slice ID/PDU Session ID pair, SMF_RUS_Pre, SMF_CUS_Dec, and HN_Dec.

After receives the N11 Message in 4a, each SMF sends N11 Message to the AMF to establish the user plane(s) for the PDU sessions. The N2 SM information contains information that the AMF shall provide to the RAN.

The SMF may further include one or more of the following information per Slice ID/PDU Session ID pair: SMF_RUS_Pr, SMF_CUS_Dec, HN_Dec, and UE_RUS_Pre.

STEP 5a: AMF to (R)AN:

The AMF communicates a N2 Request to the RAN, which can include N2 SM information received from SMF, security context, AMF Signaling Connection ID, Handover Restriction List, MM NAS Service Accept, list of Slice ID/PDU session ID pairs: per Slice ID/PDU Session ID pair. The N2 Request may optionally include one or more of: SMF_RUS_Pre, SMF_CUS_Dec, UE_RUS_Pre, and HN_Dec.

The AMF includes the following information with the N2 Request to RAN: list of Slice ID/PDU session ID pairs, per each Slice ID/PDU session ID pairs. The N2 Request may optionally include one or more of: SMF_RUS_Pre, SMF_CUS_Dec, and HN_Dec.

The (R)AN may optionally operate to make the policy decision related to security for UP terminated in RAN. The RAN's policy decision may be based on one or more of the following information provided to it:

The local policy of RAN related to security of UP terminated in RAN
UE_RUS_Pre
SMF_RUS_Pre
SMF_CUS_Dec
HN_Dec Accordingly, in some examples, the RAN receives from the AMF information that comprises at least one of: a preference of a session management entity for security protection of UP data terminating in the RAN; a preference of a session management entity for security protection of UP data terminating in the RAN; a decision by a core network for security protection of UP data termination; a decision by a home network on home terminated security protection of UP data; and a local policy of the RAN related to security protection of UP data terminating in the RAN. The RAN storing the information for use in controlling communications with the UE.

When the RAN may optionally operate to make the policy decision based on UE_RUS_Pre, and the SMF is further configured to communicate the UE_RUS_Pre to the RAN.

STEP 5b: RAN to UE

The RAN transmits an AS Security Mode Command message to the UE, which can include selected encryption and integrity algorithm for protection of CP signaling, and may optionally include (Option 1) per Slice ID/PDU Session ID: selected encryption algorithms and/or integrity algorithm for protection of UP data. This message is integrity protected with K-RRCint key.

Per Slice ID/PDU Session ID:

For all radio bearers serving the same Slice ID/PDU Session ID, the following operations and methods apply to both Option 1 of Step 5a and Option 2 of Step 6 (below):

The (R)AN stores the received information, which can include one or more of the following for this Slice ID/PDU Session ID: UE_RUS_Pre, SMF_RUS_Pre, SMF_CUS_Dec, HN_Dec, received as information in N2 SM. The RAN may have a different policy configured which may override the preference received from core network. The RAN decides and sets the policy of RAN UP security in RUS_Dec.

If RUS_Dec indicates that UP encryption termination shall be used in the RAN, then the RAN may activate encryption for all the radio bearers serving this Slice ID/PDU Session ID between UE and (R)AN. The (R)AN selects algorithm for encryption by selecting a common algorithm from the UE 5G capability (with algorithms supported by UE) received from AMF and the algorithms configured with the highest priority in the configured list in (R)AN.

If RUS_Dec indicates that UP integrity protection termination shall be used in the RAN, then the RAN may activate integrity protection for the all radio bearers serving this Slice ID/PDU Session ID between UE and (R)AN. The (R)AN selects algorithm for integrity protection by selecting a common algorithm from the UE 5G capability (with algorithms supported by UE) received from AMF and the algorithms configured with the highest priority in the configured list in (R)AN.

If RUS_Dec indicates that UP encryption terminating shall not be used in the RAN, then the RAN is precluded from activating encryption for the radio bearers serving this Slice ID/PDU Session ID between UE and (R)AN. RAN indicates to UE that UP encryption shall not be used for all the radio bearers serving this Slice ID/PDU Session ID between UE and (R)AN.

If RUS_Dec indicates that UP integrity protection terminating shall not be used in the RAN, then the RAN is precluded from activating integrity protection for the radio bearers serving this Slice ID/PDU Session ID between UE and (R)AN. RAN indicates to UE that UP integrity protection shall not be used for all the radio bearers serving this Slice ID/PDU Session ID between UE and (R)AN.

Accordingly, in some examples, the UE responds to being activated to operationally use of at least one of: encryption protection for UP data terminating in the RAN, and integrity protection for UP data terminating in the RAN, by selecting one or more algorithms supported by the UE for use for the encryption protection and/or the integrity protection that is activated for operational use. The UE then uses the one or more algorithms to encrypt and/or integrity protect UP data sent on all radio bearers serving a Slice ID and/or a PDU Session ID between the UE and the RAN.

In some further examples, the UE responds to receipt of a decision from a home network that security protection of UP data terminating in the RAN is not to be used by the UE, by responsively precluding operational use by the UE of an algorithm to encrypt and/or integrity protect UP data sent on all radio bearers serving a Slice ID and/or a PDU Session ID between the UE and the RAN.

In some other related examples, the network node (e.g., RAN) selects one or more algorithms supported by the UE for use for the encryption protection and/or the integrity protection that is activated for operational use, responsive to activating operational use of at least one of: encryption protection for UP data terminating in the RAN, and integrity protection for UP data terminating in the RAN. The network node then uses the one or more algorithms to encrypt and/or integrity protect UP data sent on all radio bearers serving a Slice ID and/or a PDU Session ID between the UE and the RAN.

In a further example, the network node (e.g., RAN) selects one or more algorithms supported by the UE for use for the encryption protection and/or the integrity protection that is activated for operational use, responsive to activating operational use of at least one of: encryption protection for UP data terminating in the RAN, and integrity protection for UP data terminating in the RAN. The network node then uses the one or more algorithms to encrypt and/or integrity protect UP data sent on all radio bearers serving a same Slice ID and/or a same PDU Session ID between the UE and the RAN.

In a further example, the network node (e.g., RAN) receives a decision from a home network that security protection of UP data terminating in the RAN is not to be used by the RAN, and responsively precludes operational use by the RAN of an algorithm to encrypt and/or integrity protect UP data sent on all radio bearers serving a Slice ID and/or a PDU Session ID between the UE and the RAN.

STEP 5c: UE to RAN:

The UE may communicate to the RAN a AS Security Mode Command Complete.

UE takes the indicated security algorithms for protection of CP signaling into use. The UE takes the indicated security algorithms for all radio bearers serving the same Slice ID and/or PDU Session for protection of UP data into use.

STEP 6: (R)AN to UE

RRC Connection Reconfiguration (Option 2: for radio bearers serving the same Slice ID and/or PDU Session ID: selected encryption algorithms and/or integrity algorithm for protection of UP data).

The RAN performs RRC Connection Reconfiguration with the UE depending on the QoS Information for all the QoS Flows of the PDU Sessions activated and Data Radio Bearers. The user plane security is established at this step, which is described in detail in RAN specifications.

Option 2: as described above in step 5b.

The RAN forwards the MM NAS Service Accept to the UE. The UE locally deletes context of PDU sessions that are not available in 5G CN.

STEP 7

After the user plane radio resources are setup, the uplink data from the UE can now be forwarded to RAN. The 5G RAN sends the uplink data to the UPF address and Tunnel ID provided in Step 4.

1.1.3 Connected Mode Mobility—N2 Handover

Figure 7:
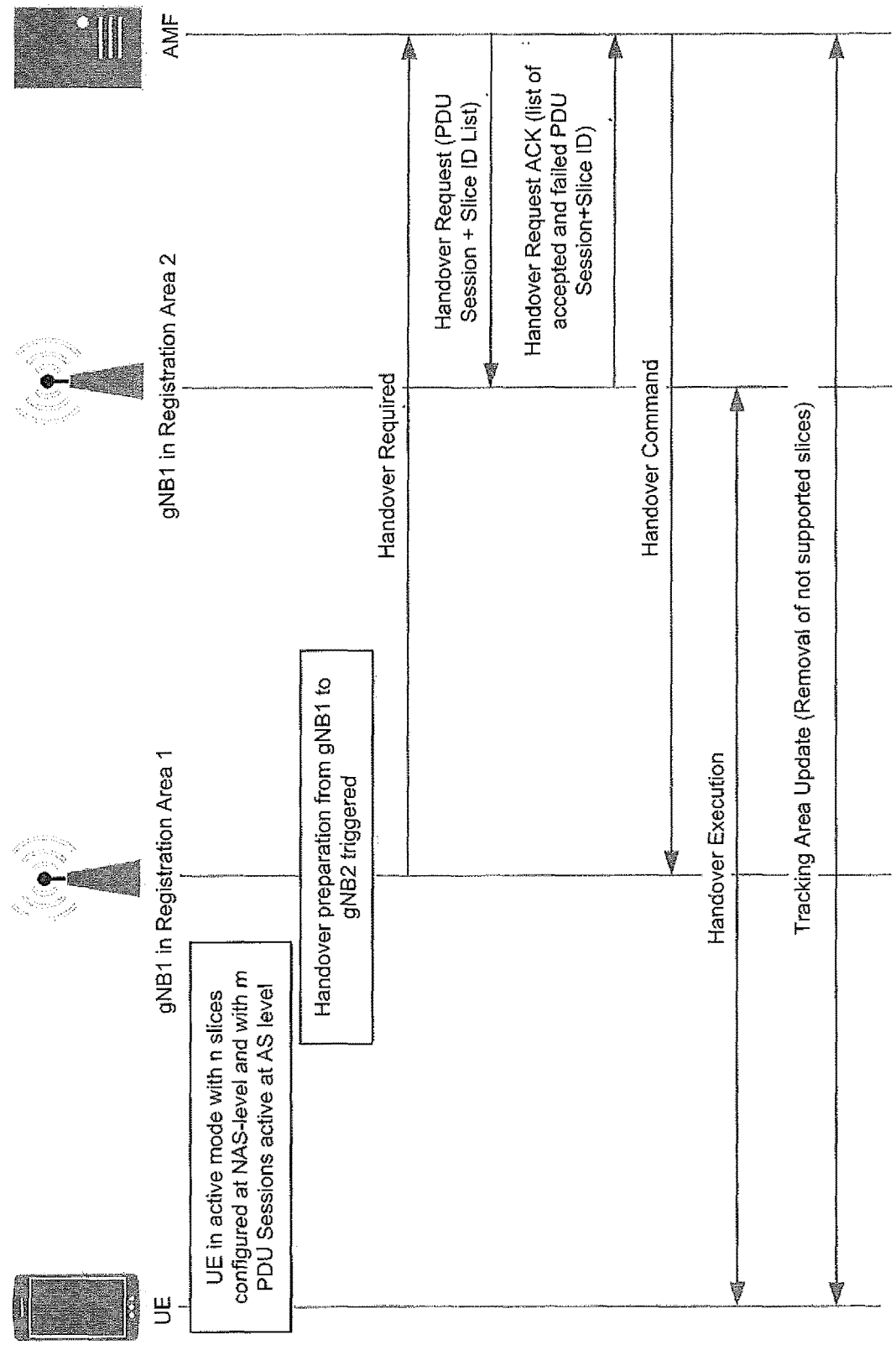
FIG. 7 illustrates a combined flowchart and data flow diagram of operations and methods for call flow for slice access management.

FIG. 7 illustrates a combined flowchart and data flow diagram of operations and methods for call flow for slice access management in Active mode CN involved mobility, by a UE, a gNB1 in Registration Area 1, another gNB2 in Registration Area 2, and an AMF.

To enable a target gNB to make Slice-specific admission control decisions and to choose the appropriate slice specific core node entities, a source gNB needs to pass on slices that a UE in question is using to a target gNB as part of the HO procedure.

When a target cell is selected, handover signaling is initiated. Such procedure attempts to move PDU Session resources for all active slices of the UE from one source node to a target node.

If a handover procedure involves a NGC, during such procedure the target AMF is responsible for removing (or inactivating) at NAS level any slice no longer supported at the target node. PDU Sessions that are associated with the removed slices are not admitted at target node.

An example of such call flow is shown in FIG. 7 for the case of CN involved handover. The case of X2-like handover can be easily deduced.

The gNB1 includes in HANDOVER REQUIRED and AMF includes in HANDOVER REQUEST message a list of Slice ID/PDU session pairs for which resources need to be allocated by the target gNB2. And per each Slice ID/PDU session ID pair: RUS_Dec. The AMF thus includes in the HANDOVER REQUEST message to the target gNB2 the UE's UP security policy.

Per Each Slice ID/PDU Session ID Pair:

Referring to FIG. 7, if RUS_Dec indicates that UP encryption terminating in RAN shall be used, then the target gNB2 selects the algorithm with highest priority from the UE 5G security capabilities according to the prioritized locally configured list of algorithms (this applies for both integrity and ciphering algorithms). The chosen encryption algorithm and an indication that UP encryption terminating in RAN shall be used, is indicated (signaled through communications) to the UE per each Slice ID/PDU session ID pair in the handover command if the target gNB selects different algorithms compared to the source gNB. If the UE receives an indication that UP encryption terminating in RAN shall be used, but does not receive any selection of ciphering algorithm, then the UE continues to use the same algorithm as before the handover (see TS 36.331 [21]). The target gNB2 may reject any PDU sessions for which it cannot comply with the received UP security policy.

In contrast, if RUS_Dec indicates that UP integrity protection terminating in RAN shall be used, then the target gNB2 selects the algorithm with highest priority from the UE 5G security capabilities according to the prioritized locally configured list of algorithms (this applies for both integrity and ciphering algorithms). The chosen integrity protection algorithm and an indication that UP integrity protection terminating in RAN shall be used, is indicated (signaled through communications) to the UE per each Slice ID/PDU session ID pair in the handover command if the target gNB selects different algorithm compared to the source gNB. If the UE receives an indication that UP integrity protection terminating in RAN shall be used, but does not receive any selection of integrity protection algorithm, then the UE continues to use the same algorithm as before the handover (see TS 36.331 [21]).

1.1.4 Connected Mode Mobility—Xn Handover

Figure 8:
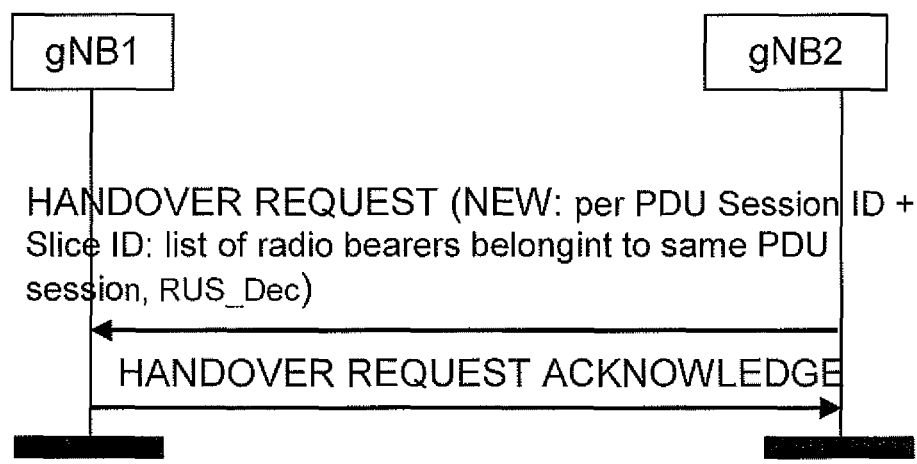
FIG. 8 illustrates a combined flowchart and data flow diagram of operations and methods for a handover procedure between a gNB1 and another gNB2.

FIG. 8 illustrates a combined flowchart and data flow diagram of operations and methods for a handover procedure between a gNB1 and another gNB2.

Referring to FIG. 8, the source gNB1 includes in HANDOVER REQUEST message. This message contains a list of PDU Session ID's+Slice ID's. This message contains per PDU Session ID, including containing:

- a list of radio bearers belonging to the same PDU Session ID;
- an indication of whether UP encryption terminating in RAN shall be used or not; and
- an indication of whether UP integrity protection terminating in RAN shall be used or not. The source gNB1 thus includes in the HANDOVER REQUEST message the UE's UP security policy.

For all radio bearers belonging to the same PDU session ID, and if RUS_Dec indicates that UP encryption terminating in RAN shall be used, then the target gNB2 selects the algorithm with highest priority from the UE 5G security capabilities according to the prioritized locally configured list of algorithms. The chosen encryption algorithm and an indication that UP encryption terminating in RAN shall be used, is indicated to the UE for all the radio bearers belonging to the same PDU Session ID+Slice ID in the HANDOVER COMMAND message if the target gNB selects different algorithms compared to the source gNB. If the UE receives an indication that UP encryption terminating in RAN shall be used, but does not receive any selection of ciphering algorithm, then the UE continues to use the same algorithm as before the handover (see TS 36.331 [21]).

For all radio bearers belonging to the same PDU session ID, and if RUS_Dec indicates that UP integrity protection terminating in RAN shall be used, then the target gNB2 selects the algorithm with highest priority from the UE 5G security capabilities according to the prioritized locally configured list of algorithms. The chosen integrity protection algorithm and an indication that UP integrity protection terminating in RAN shall be used, indicated to the UE for all the radio bearers belonging to the same PDU Session ID+Slice ID. If the UE receives an indication that UP integrity protection terminating in RAN shall be used, but does not receive any selection of integrity protection algorithm, then the UE continues to use the same algorithm as before the handover (see TS 36.331 [21]).

If the target base-station (gNB2) does not support encryption of UP data terminating in RAN and RUS_Dec from the source base station (gNB1) indicates that UP encryption shall be used, then the target base-station (gNB2) can operate to either reject the handover request from the source base-station by responding with an error code or accept the request but still indicate to the source base-station in the handover response message that UP encryption can not be used in target base-station. The policy configured for the target node can determine the appropriate action. If the target base-station accepts the request but indicates to the source base-station in the response that UP encryption cannot be used, then a policy configured in the source base-station can determine whether the source base-station should proceed with the procedure or terminate the connection with the target base-station. In other examples, the target gNB2 may reject any PDU sessions for which it cannot comply with the received UP security policy.

If the target base-station (gNB2) does not support integrity protection of UP data terminating in RAN and the RUS_Dec from the source base station (gNB1) indicates that UP integrity shall be used, then the target base-station (gNB2) can operate to either reject the handover request from the source base-station by responding with an error code or accept the request but still indicate to the source base-station in the handover response message that UP integrity cannot be used in target base-station. The policy configured for the target node can determine the appropriate action. If the target base-station accepts the request but indicates to the source base-station in the response that UP integrity cannot be used, then a policy configured in the source base-station can determine whether the source base-station should proceed with the procedure or terminate the connection with the target base-station.

Example UE, Network Node, SMF, UDM, and Related Modules Thereof

Figure 13:
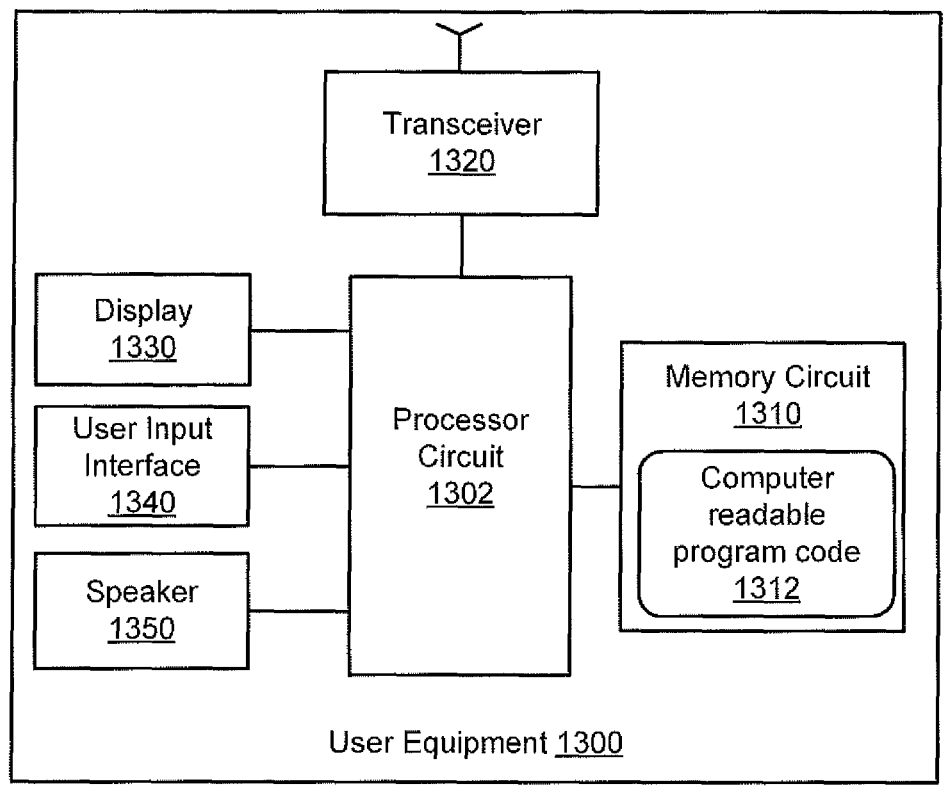
FIG. 13 is a block diagram of a UE.

FIG. 13 is a block diagram of a UE 1300 that is configured to wirelessly communicate with a communication network according to one or more embodiments disclosed herein for a UE. The UE 1300 includes a transceiver circuit 1320, a processor circuit 1302 ("processor"), and a memory circuit 1310 ("memory") containing computer readable program code 1312. The UE 1300 may further include a display 1330, a user input interface 1340, and a speaker 1350.

The transceiver 1320 is configured to communicate with network nodes, such as a RAN, and may communicate with other UEs, through a wireless air interface using one or more of the radio access technologies disclosed herein. The processor 1302 may include one or more data processing circuits, such as a general purpose and/or special purpose processor, e.g., microprocessor and/or digital signal processor. The processor 1302 is configured to execute the computer readable program code 1312 in the memory 1312 to perform at least some of the operations described herein as being performed by a UE.

Figure 14:
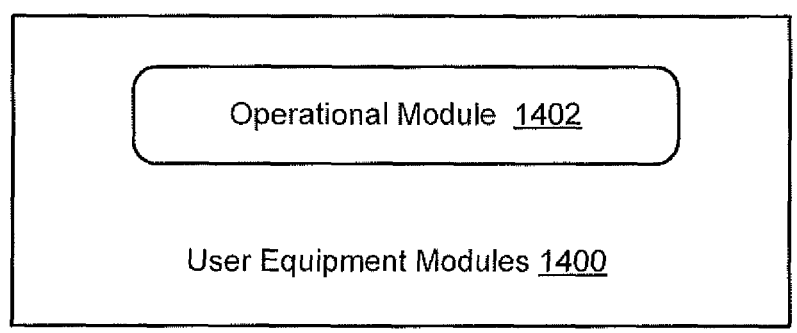
FIG. 14 illustrates modules residing in a UE.

FIG. 14 illustrates modules 1400 residing in a UE that perform operations as disclosed herein according to some embodiments and examples of the present disclosure. The modules 1400 include an operational module 1402. The operational module 1402 may perform one or more of the operations and methods disclosed herein as being performed by a UE. The operational module may for example transmit, in a request message to the communication network, an indication of operational support by the UE for security protection of UP data terminating in a RAN.

Figure 15:
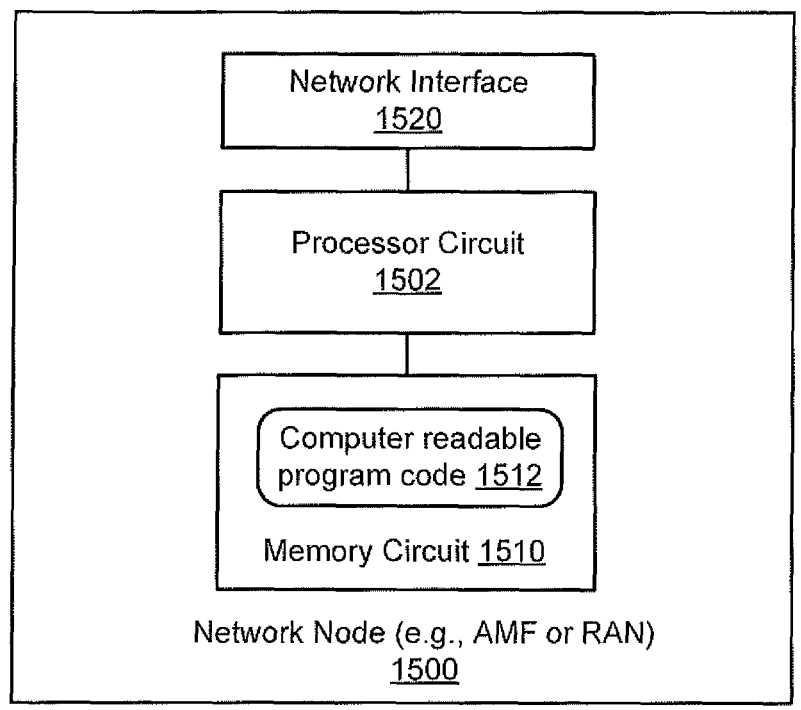
FIG. 15 is a block diagram of a network node.

FIG. 15 is a block diagram of a network node 1500 of a communication network that is configured to communicate with a UE according to one or more embodiments and examples disclosed herein for a network node. The network node 1500 may correspond to the AMF and/or RAN configured according to at least one embodiment or example disclosed herein. The network node 1500 can include a network interface 1520 (e.g., wired network interface and/or wireless transceiver), a processor circuit 1502 ("processor"), and a memory circuit 1510 ("memory") containing computer readable program code 1512.

The processor 1502 may include one or more data processing circuits, such as a general purpose and/or special purpose processor, e.g., microprocessor and/or digital signal processor, that may be collocated or distributed across one or more networks. The processor 1502 is configured to execute the computer readable program code 1512 in the memory 1510 to perform at least some of the operations and methods of described herein as being performed by a network node, such as the AMF and/or the RAN. The network interface 1520 communicates with a UE, another network node, and/or a core network.

Figure 16:
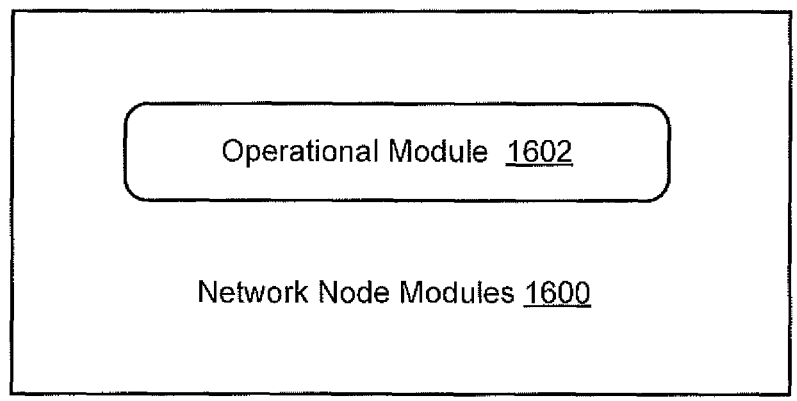
FIG. 16 illustrates modules residing in a network node.

FIG. 16 illustrates modules 1600 residing in a network node that perform operations as disclosed herein according to some embodiments for a AMF and/or a RAN. The modules 1600 include an operational module 1602 that performs one or more of the operations and methods disclosed herein as being performed by a network node, which may be the AMF and/or the RAN. For example, the operational module may receive a request message from the UE containing an indication of operational support by the UE for security protection of User Plane, UP, data terminating in a Radio Access Network, RAN.

Figure 17:
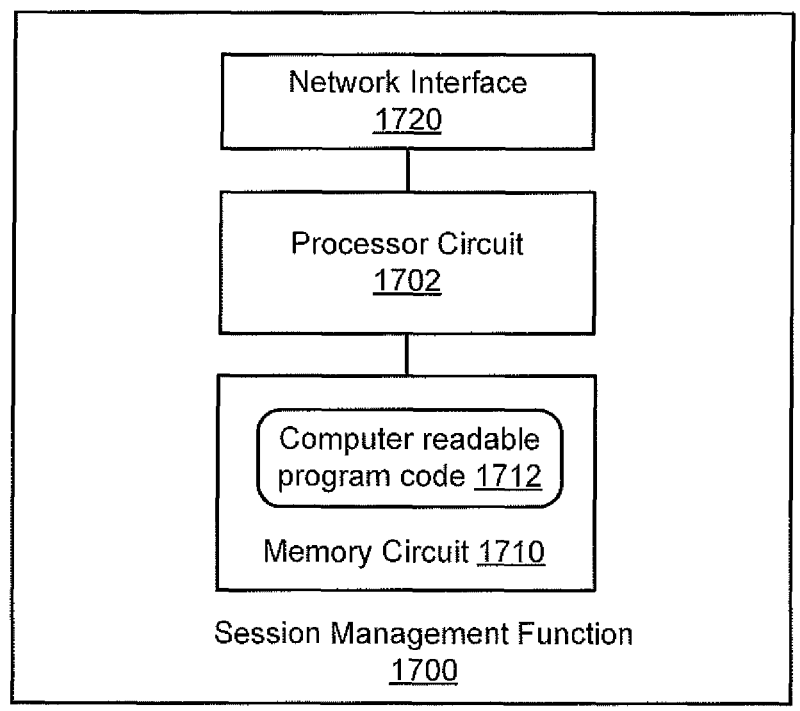
FIG. 17 is a block diagram of a SMF.

FIG. 17 is a block diagram of a Session Management Function (SMF) 1700 of a communication network that is configured to communicate with a Core Access and Mobility Management Function (AMF) of the communication network. The SMF 1700 can include a network interface 1720 (e.g., wired network interface and/or wireless transceiver), a processor circuit 1702 ("processor"), and a memory circuit 1710 ("memory") containing computer readable program code 1712.

The processor 1702 may include one or more data processing circuits, such as a general purpose and/or special purpose processor, e.g., microprocessor and/or digital signal processor, that may be collocated or distributed across one or more networks. The processor 1702 is configured to execute the computer readable program code 1712 in the memory 1710 to perform at least some of the operations and methods of described herein as being performed by a SMF. The network interface 1720 communicates with an AMF and UDM.

Figure 18:
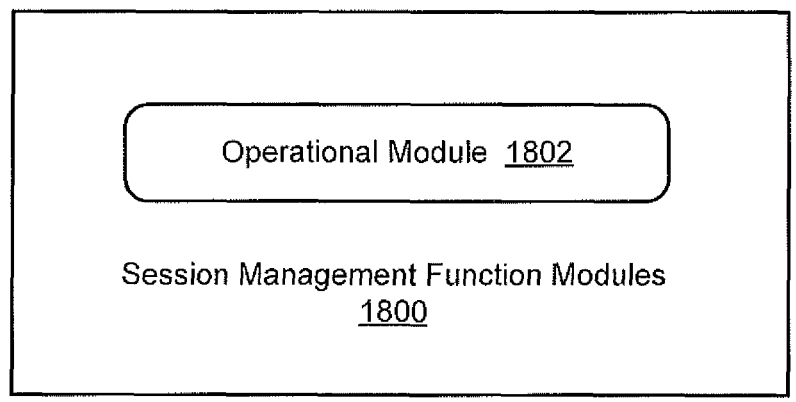
FIG. 18 illustrates modules residing in a SMF.

FIG. 18 illustrates modules 1800 residing in a SMF that perform operations as disclosed herein according to some embodiments for a SMF. The modules 1800 include an operational module 1802 that performs one or more of the other operations and methods disclosed herein as being performed by an SMF. For example the operational module may receive an indication from the AMF of operational support by a UE for security protection of UP data terminating in a RAN.

Figure 19:
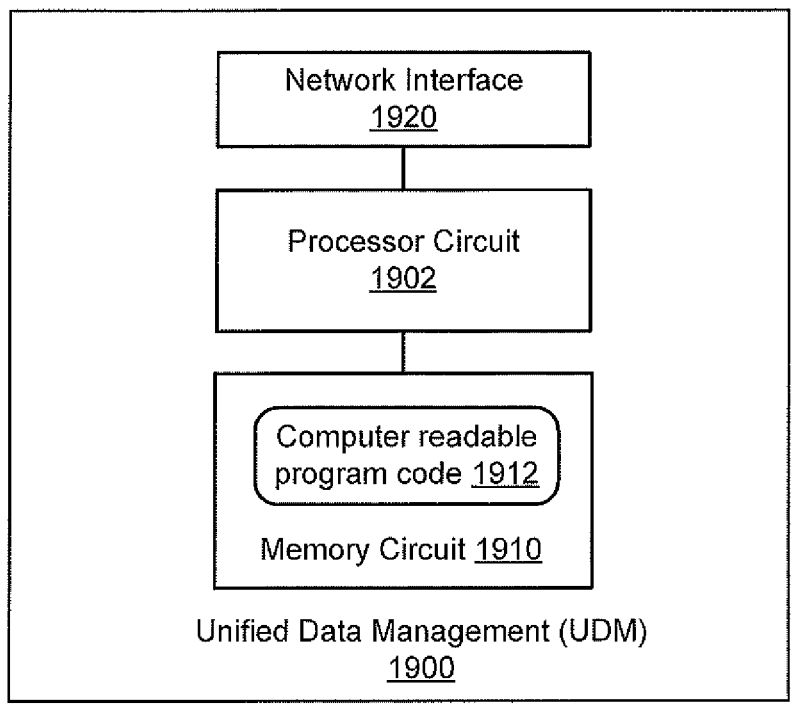
FIG. 19 is a block diagram of a UDM.

FIG. 19 is a block diagram of a Unified Data Management (UDM) 1900 of a communication network that is configured to communicate with a Session Management Function (SMF) of the communication network. The UDM 1900 can include a network interface 1920 (e.g., wired network interface and/or wireless transceiver), a processor circuit 1902 ("processor"), and a memory circuit 1910 ("memory") containing computer readable program code 1912.

The processor 1902 may include one or more data processing circuits, such as a general purpose and/or special purpose processor, e.g., microprocessor and/or digital signal processor, that may be collocated or distributed across one or more networks. The processor 1902 is configured to execute the computer readable program code 1912 in the memory 1910 to perform at least some of the operations and methods of described herein as being performed by a UDM. The network interface 1920 communicates with a SMF and other nodes of the network.

Figure 20:
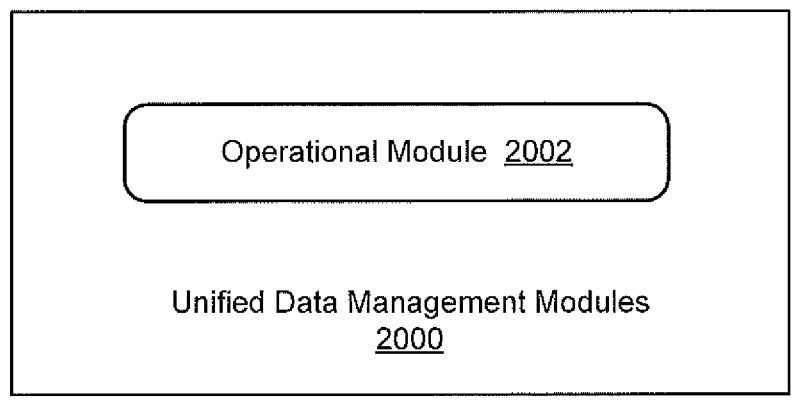
FIG. 20 illustrates modules residing in a UDM.

FIG. 20 illustrates modules 2000 residing in a UDM that perform operations as disclosed herein according to some embodiments for a UDM. The modules 2000 include an operational module 2002 that performs one or more of the other operations and methods disclosed herein as being performed by a network node, which may be the UDM. For example, the operational module may receive (1200B of FIG. 12B) a subscription data request from the SMF for SM-related subscription data for a UE, and communicates (1202B of FIG. 12B) a subscription data response indicating a home network preference related to a RAN terminated UP data security for communications with the UE or decision on home network terminated UP data security for communications with the UE.

Abbreviations

AMF Access Management Function
HSS Home Subscriber Server
SDM Subscriber Data Management
MME Mobility Management Entity
gNB Next Generation Node-B
eNB evolved Node-B
UP User Plane
RAN Radio Access Network
GPRS General Packet Radio Service
IoT Internet of Things
NGC Next Generation Core Further Definitions and Embodiments In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The following are certain enumerated embodiments further illustrating various aspects the disclosed subject matter:
1. A method for operating a User Equipment, UE, that is configured to wirelessly communicate with a communication network, the method comprising:
    transmitting (900), in a request message to the communication network, an indication of operational support by the UE for security protection of User Plane, UP, data terminating in a Radio Access Network, RAN.
2. The method of Embodiment 1, wherein:
    the request message is transmitted (902) as a Protocol Data Unit, PDU, Session Establishment Request message toward a Session Management Function, SMF, in the communication network, of the operational support by the UE for security protection of UP data terminating in the RAN.
3. The method of Embodiment 2, wherein:
    the transmitted indication identifies a UE preference whether to operate using security protection that comprises at least one of:
    encryption protection for UP data terminating in the RAN; and
    integrity protection for UP data terminating in the RAN.
4. The method of any of Embodiments 1 to 3, wherein:
    the transmitted indication identifies a UE preference whether to operate using the security protection of UP data of communications in an identified PDU Session ID.
5. A method of Embodiment 4, wherein the transmitted indication identifies the UE preference whether to operate using the security protection for UP data of communications according to at least one of:
    all UP data exchanged with the RAN for all PDU sessions of all slice types; and
    all UP data exchanged with a specific slice type or with a specific slice identifier.
6. A method of Embodiment 4, wherein:
    the transmitted indication identifies a Network Slice Selection Assistance Information, NSSAI, or a Data Network Name, DNN to which the UE preference applies.
7. The method of any of Embodiments 1 to 6, wherein:
    the indication comprises a UE 5G security capability indication transmitted by the UE to the communication network.

8. The method of Embodiment 1, wherein:

the request message is transmitted (904) as a Non-Access-Stratus (NAS) Service Request message to the RAN, of the operational support by the UE for security protection of UP data terminating in the RAN.

9. The method of Embodiment 8, wherein:

the transmitted indication identifies a UE preference whether to operate using security protection that comprises at least one of:

encryption protection for UP data terminating in the RAN; and integrity protection for UP data terminating in the RAN.

10. The method of any of Embodiments 8 to 9, wherein:

the transmitted indication identifies a UE preference whether to operate using the security protection of UP data of communications in an identified PDU Session ID.

11. A method of Embodiment 10, wherein the transmitted indication identifies the UE preference whether to operate using the security protection for UP data of communications according to at least one of:

all UP data exchanged with the RAN for all PDU sessions of all slice types; and all UP data exchanged with a specific slice type or with a specific slice identifier.

12. The method of any of Embodiments 8 to 11, further comprising:

selecting one or more algorithms supported by the UE for use for the encryption protection and/or the integrity protection that is activated for operational use, responsive to activating operational use of at least one of: encryption protection for UP data terminating in the RAN; and integrity protection for UP data terminating in the RAN; and using the one or more algorithms to encrypt and/or integrity protect UP data sent on all radio bearers serving a Slice ID and/or a PDU Session ID between the UE and the RAN.

13. The method of any of Embodiments 8 to 11, further comprising:

receiving a decision from a home network that security protection of UP data terminating in the RAN is not to be used by the UE, and responsively precluding operational use by the UE of an algorithm to encrypt and/or integrity protect UP data sent on all radio bearers serving a Slice ID and/or a PDU Session ID between the UE and the RAN.

14. A User Equipment, UE, (1300) configured to perform the method of any of Embodiments 1 to 13.

15. A User Equipment, UE, (1300) that is configured to wirelessly communicate with a communication network, the UE comprising:

a transceiver (1320);

a memory (1310) storing computer readable program code; and a processor (1302) connected to the transceiver (1320) and the memory (1310) to execute the computer readable program code to:

transmit, in a request message to the communication network, an indication of operational support by the UE for security protection of User Plane, UP, data terminating in a Radio Access Network, RAN.

16. The UE (1300) of Embodiment 15, wherein the processor (1302) further executes the computer readable program code to perform the method of any of Embodiments 2 to 13.

17. A User Equipment, UE, (1300) that wirelessly communicates with a communication network, the UE performing operations comprising:

transmitting, in a request message to the communication network, an indication of operational support by the UE for security protection of User Plane, UP, data terminating in a Radio Access Network, RAN.

18. The UE (1300) of Embodiment 17, wherein UE performing operations comprising the method of any of Embodiments 2 to 13.

19. A method for operating a network node (1500) of a communication network that is configured to communicate with a User Equipment, UE, the method comprising:

receiving (1000) a request message from the UE containing an indication of operational support by the UE for security protection of User Plane, UP, data terminating in a Radio Access Network, RAN.

20. The method of Embodiment 19, wherein:

the request message is received in a Protocol Data Unit, PDU, Session Establishment Request message.

21. The method of Embodiment 20, wherein the method is performed by a Core Access and Mobility Management Function, AMF, in the communication network, and further comprising:

forwarding the indication to a Session Management Function, SMF, of the communication network.

22. The method of Embodiment 21, further comprising:

communicating with the indication to the SMF, policy information that identifies whether the SMF is allowed to request a change to RAN security.

23. The method of Embodiment 21, further comprising:

communicating with the indication to the SMF, a default security policy value indicating at least one of: whether the UE uses encryption protection for UP data terminating in the RAN by default; and whether the UE uses integrity protection for UP data terminating in the RAN by default.

24. The method of any of Embodiments 20 to 23, wherein:

the received indication identifies a UE preference whether to operate using security protection that comprises at least one of:

encryption protection for UP data terminating in the RAN; and integrity protection for UP data terminating in the RAN.

25. The method of any of Embodiments 20 to 24, wherein:

the received indication identifies a UE preference whether to operate using the security protection of UP data of communications in an identified PDU Session ID.

26. A method of Embodiment 25, wherein the received indication identifies the UE preference whether to operate using the security protection for UP data of communications according to at least one of:

all UP data exchanged with the RAN for all PDU sessions of all slice types; and all UP data exchanged with a specific slice type or with a specific slice identifier.

27. A method of Embodiment 25, wherein:

the received indication identifies a Network Slice Selection Assistance Information, NSSAI, or a Data Network Name, DNN to which the UE preference applies.

28. The method of Embodiment 20, wherein:

the received indication comprises a UE 5G security capability indication transmitted by the UE to the communication network.

29. The method of Embodiment 20, further comprising:

responsive to activating operational use of at least one of: encryption protection for UP data terminating in the RAN, and integrity protection for UP data terminating in the RAN, selecting one or more algorithms used for the encryption protection and/or the integrity protection that is activated for operational use; and using the one or more algorithms to encrypt and/or integrity protect UP data sent on all radio bearers serving a PDU Session ID in a Radio Resource Control, RRC, Connection Reconfiguration message to the UE.

30. The method of Embodiment 29, further comprising:
communicating to an Access and Mobility Management Function, AMF, a policy decision indicating at least one of: whether UP data encryption termination in the RAN is used for the PDU Session ID; and whether UP data integrity protection termination in the RAN is used for the PDU Session ID.

31. The method of Embodiment 19, wherein:
the network node is the RAN; and
the request message is received (1004) as a Non-Access-Stratus, NAS, Service Request message, of operational support by the UE for security protection of UP data terminating in the RAN, and at least one of a per slice ID and a Protocol Data Unit, PDU, session ID.

32. The method of Embodiment 31, further comprising:
responsive to receiving the Non-Access-Stratus (NAS) Service Request message, communicating to a Core Access and Mobility Management Function, AMF, in the communication network, the indication and at least one of the per slice ID and the Protocol Data Unit, PDU, session ID.

33. The method of any of Embodiments 31 to 32, further comprising:
receiving from a Core Access and Mobility Management Function, AMF, of the communication network, information that comprises at least one of: a preference of a session management entity for security protection of UP data terminating in the RAN; a preference of a session management entity for security protection of UP data terminating in the RAN; a decision by a core network for security protection of UP data termination; a decision by a home network on home terminated security protection of UP data; and a local policy of the RAN related to security protection of UP data terminating in the RAN; and
storing the information for use in controlling communications with the UE.

34. The method of any of Embodiments 31 to 33, further comprising:
selecting one or more algorithms supported by the UE for use for the encryption protection and/or the integrity protection that is activated for operational use, responsive to activating operational use of at least one of: encryption protection for UP data terminating in the RAN, and integrity protection for UP data terminating in the RAN; and
using the one or more algorithms to encrypt and/or integrity protect UP data sent on all radio bearers serving a Slice ID and/or a PDU Session ID between the UE and the RAN.

35. The method of any of Embodiments 31 to 33, further comprising:
selecting one or more algorithms supported by the UE for use for the encryption protection and/or the integrity protection that is activated for operational use, responsive to activating operational use of at least one of: encryption protection for UP data terminating in the RAN, and integrity protection for UP data terminating in the RAN; and
using the one or more algorithms to encrypt and/or integrity protect UP data sent on all radio bearers serving a same Slice ID and/or a same PDU Session ID between the UE and the RAN.

36. The method of any of Embodiments 31 to 35, further comprising:
receiving a decision from a home network that security protection of UP data terminating in the RAN is not to be used by the RAN, and responsively precluding operational use by the RAN of an algorithm to encrypt and/or integrity protect UP data sent on all radio bearers serving a Slice ID and/or a PDU Session ID between the UE and the RAN.

37. A network node (1500) of a communication network, the network node configured to perform the method of any of Embodiments 19 to 36.

38. A network node (1500) of a communication network that is configured to communicate with a User Equipment, UE, the network node comprising:
a memory (1520) storing computer readable program code; and
a processor (1502) connected to the memory (1520) to execute the computer readable program code to:
receive a request message from the UE containing an indication of operational support by the UE for security protection of User Plane, UP, data terminating in a Radio Access Network, RAN.

39. The network node (1500) of Embodiment 38, wherein the processor (1502) further executes the computer readable program code to perform the method of any of Embodiments 19 to 36.

40. A network node (1500) that wirelessly communicates with a communication network, the UE performing operations comprising:
receiving a request message from the UE containing an indication of operational support by the UE for security protection of User Plane, UP, data terminating in a Radio Access Network, RAN.

41. The network node (1500) of Embodiment 40, wherein the network node performs operations comprising the method of any of Embodiments 19 to 36.

42. A method for operating a Session Management Function, SMF, of a communication network that is configured to communicate with a Core Access and Mobility Management Function, AMF, of the communication network, the method comprising:
receiving (1100) an indication from the AMF of operational support by a UE for security protection of User Plane, UP, data terminating in a Radio Access Network, RAN.

43. The method of Embodiment 42, further comprising:
receiving with the indication, policy information that identifies whether the SMF is allowed to request a change to RAN security.

44. The method of Embodiment 42, further comprising:
responsive the receiving, determining (1102) whether the SMF contains a common local policy that applies to all UEs and, if not, communicating a subscription data request to a Unified Data Management, UDM, to retrieve SM-related subscription data for the UE related with a Data Network Name, DNN.

45. The method of any of Embodiments 42 to 44, wherein:
the received indication identifies a UE preference whether to operate using security protection that comprises at least one of:
encryption protection for UP data terminating in the RAN; and
integrity protection for UP data terminating in the RAN.

46. The method of any of Embodiments 42 to 45, further comprising:
communicating (1104) to the AMF a SM Request Ack message that includes a SMF request of security protection of UP data terminated in the RAN, a SMF decision of Core Network, CN, terminated security protection of UP data in a serving network, and/or a home network decision of CN terminated security protection of UP data in the home network.

47. A Session Management Function, SMF, (1700) of a communication network that is configured to communicate with a Core Access and Mobility Management Function, AMF, of the communication network, the SMF configured to perform the method of any of Embodiments 42 to 46.

48. A Session Management Function, SMF, (1700) of a communication network that is configured to communicate with a Core Access and Mobility Management Function, AMF, of the communication network, the SMF comprising:

a memory (1710) storing computer readable program code; and a processor (1702) connected to the memory (1710) to execute the computer readable program code to:

receive an indication from the AMF of operational support by a UE for security protection of User Plane, UP, data terminating in a Radio Access Network, RAN.

49. The SMF (1700) of Embodiment 48, wherein the processor (1702) further executes the computer readable program code to perform the method of any of Embodiments 42 to 46.

50. A Session Management Function, SMF, (1700) of a communication network that is configured to communicate with a Core Access and Mobility Management Function, AMF, of the communication network, the SMF performing operations comprising:

receiving an indication from the AMF of operational support by a UE for security protection of User Plane, UP, data terminating in a Radio Access Network, RAN.

51. The SMF (1700) of Embodiment 50, wherein the SMF performs operations comprising the method of any of Embodiments 42 to 46.

52. A method for operating a Unified Data Management, UDM, (1900) of a communication network that is configured to communicate with a Session Management Function, SMF, of the communication network, the method comprising:

receiving (1200) a subscription data request from the SMF for SM-related subscription data for a UE; and communicating (1202) a subscription data response indicating a home network preference related to a Radio Access Network, RAN, terminated User Plane, UP, data security for communications with the UE or decision on home network terminated UP data security for communications with the UE.

53. The method of Embodiment 52, wherein:

the subscription data response indicates whether UP data encryption terminating in the RAN should be used, must be used, or is indifferent for use with the UE.

54. The method of Embodiment 52, wherein:

the subscription data response indicates whether UP data integrity protection terminating in the RAN should be used, must be used, or is indifferent for use with the UE.

55. The method of any of Embodiments 52 to 54, wherein:

the subscription data response indicates whether UP data encryption and/or integrity protection should be terminated in a Core Network, CN, in the home network.

56. A Unified Data Management, UDM, of a communication network that is configured to communicate with a Session Management Function, SMF, of the communication network, the UDM configured to perform the method of any of Embodiments 52 to 55.

57. A Unified Data Management, UDM, of a communication network that is configured to communicate with a Session Management Function, SMF, of the communication network, the UDM comprising:

a memory storing computer readable program code; and a processor connected to the memory to execute the computer readable program code to:

receive (1200) a subscription data request from the SMF for SM-related subscription data for a UE; and communicate (1202) a subscription data response indicating a home network preference related to a Radio Access Network, RAN, terminated User Plane, UP, data security for communications with the UE or decision on home network terminated UP data security for communications with the UE.

58. The UDM of Embodiment 57, wherein the processor further executes the computer readable program code to perform the method of any of Embodiments 52 to 55.

59. A Unified Data Management, UDM, of a communication network that is configured to communicate with a Session Management Function, SMF, of the communication network, the UDM performing operations comprising:

receiving (1200) a subscription data request from the SMF for SM-related subscription data for a UE; and communicating (1202) a subscription data response indicating a home network preference related to a Radio Access Network, RAN, terminated User Plane, UP, data security for communications with the UE or decision on home network terminated UP data security for communications with the UE.

60. The UDM of Embodiment 59, wherein the UDM performs operations comprising the method of any of Embodiments 52 to 55.

The invention claimed is:

1. A method comprising:
    a user equipment (UE) transmitting, via a radio access network (RAN) node, a Protocol Data Unit (PDU) Session Establishment Request message toward a Session Management Function (SMF); and
    after transmitting the PDU Session Establishment Request message, the UE receiving from the RAN node a Radio Resource Control (RRC) Connection Reconfiguration message comprising: i) a PDU session identifier (ID), ii) a PDU Session Establishment Accept message generated by the SMF, and iii) a user plane (UP) security policy for the PDU Session identified by the PDU session ID, wherein:
    the UP security policy for the PDU session indicates:
    i) whether UP confidentiality protection shall be activated or not for all data radio bearers (DRBs) belonging to the PDU session; and/or
    ii) whether UP integrity protection shall be activated or not for all data radio bearers (DRBs) belonging to the PDU session.

2. The method of claim 1, further comprising activating at least one of: confidentiality protection or integrity protection for the PDU Session.

3. The method of claim 1, further comprising:
    receiving a decision from a home network that security protection of UP data terminating in the RAN is not to be used by the UE, and
    responsively precluding operational use by the UE of an algorithm to, at least one of, encrypt or integrity protect UP data sent on all radio bearers serving at least one of a Slice ID or a PDU Session ID between the UE and the RAN.

4. A method for operating a network node of a communication network that is configured to communicate with a user equipment (UE), the method comprising:
    receiving a Protocol Data Unit (PDU) Session Establishment Request message for establishing a PDU session, wherein the PDU Session Establishment Request message was transmitted by the UE and includes a PDU session identifier (ID);

communicating a Session Management (SM) Request comprising the PDU Session Establishment Request to a Session Management Function (SMF) of the communication network; and receiving from the SMF a message that includes: i) the PDU Session ID identifying the PDU session, ii) a PDU Session Establishment Accept message, and iii) a user plane (UP) security policy for the PDU session, wherein:

the UP security policy for the PDU session indicates:

i) whether UP confidentiality protection shall be activated or not for all data radio bearers (DRBs) belonging to the PDU session, and/or ii) whether UP integrity protection shall be activated or not for all data radio bearers (DRBs) belonging to the PDU session.

5. The method of claim 4, wherein the method is performed by an Access and Mobility Management Function, AMF, in the communication network.

6. The method of claim 5, further comprising:

communicating to the SMF, policy information that identifies whether the SMF is allowed to request a change to RAN security.

7. The method of claim 5, further comprising:

communicating to the SMF, a default security policy value indicating at least one of: whether the UE uses encryption protection for UP data terminating in the RAN by default; and whether the UE uses integrity protection for UP data terminating in the RAN by default.

8. The method of claim 5, further comprising transmitting to a RAN node a PDU session request comprising: i) the PDU Session ID identifying the PDU session, ii) the PDU Session Establishment Accept message, and iii) the UP security policy for the PDU session.

9. A method for operating a base station of a communication network that is configured to communicate with a user equipment (UE), the method comprising:

the base station receiving from a UE a message comprising a Protocol Data Unit (PDU) Session Establishment Request message, the PDU Session Establishment Request message comprising a PDU session identifier (ID);

the base station forwarding the PDU Session Establishment Request message to an Access and Management Function (AMF);

the base station receiving from the AMF a PDU session request comprising: i) the PDU Session ID, ii) a PDU Session Establishment Accept message generated by a Session Management Function (SMF), and iii) a user plane (UP) security policy for the PDU session identified by the PDU session ID; and the base station transmitting to the UE a Radio Resource Control (RRC) Connection Reconfiguration message comprising the PDU Session Establishment Accept message generated by the SMF, wherein the UP security policy for the PDU session indicates:

i) whether UP confidentiality protection shall be activated or not for all data radio bearers (DRBs) belonging to the PDU session, and/or ii) whether UP integrity protection shall be activated or not for all data radio bearers (DRBs) belonging to the PDU session.

10. The method of claim 9, wherein the method is performed by a network node in the RAN.

11. The method of claim 9, further comprising including selected algorithms for at least one of integrity protection or encryption in the RRC Connection Reconfiguration message.

12. A method for operating a Session Management Function (SMF) of a communication network that is configured to communicate with an Access and Mobility Management Function (AMF) of the communication network, the method comprising:

the SMF receiving from the AMF a Session Management (SM) Request comprising a PDU Session Establishment Request for a user equipment (UE); and the SMF communicating to the AMF a message that includes: i) a PDU Session ID identifying a PDU session, ii) a PDU Session Establishment Accept message, and iii) a user plane (UP) security policy for the PDU session, wherein the UP security for the PDU session indicates:

i) whether UP confidentiality protection shall be activated or not for all data radio bearers (DRBs) belonging to the PDU session, and/or ii) whether UP integrity protection shall be activated or not for all data radio bearers (DRBs) belonging to the PDU session.

13. The method of claim 12, further comprising:

receiving with the SM request, policy information that identifies whether the SMF is allowed to request a change to RAN security.

14. The method of claim 12, further comprising:

responsive the receiving, determining whether the SMF contains a common local policy that applies to all UEs and, if not, communicating a subscription data request to a Unified Data Management, UDM, to retrieve SM-related subscription data for the UE related with a Data Network Name, DNN.

15. The method of claim 14, wherein:

the retrieved SM-related subscription data for the UE identifies whether to operate using security protection that comprises at least one of:

encryption protection for UP data terminating in the RAN; and integrity protection for UP data terminating in the RAN.

16. The method of claim 12, wherein the SM Request Ack message includes at least one of: a SMF request of security protection of UP data terminated in the RAN, a SMF decision of Core Network (CN) terminated security protection of UP data in a serving network, or a home network decision of CN terminated security protection of UP data in the home network.

17. The method of claim 12, further comprising:

responsive the receiving, obtaining a policy for security protection of UP data terminating in a RAN from a Policy Control Function.

18. A user equipment (UE) that wirelessly communicates with a communication network, the UE comprising: a transmitter; and a receiver, wherein the UE is configured to:

use the transmitter to transmit, via a radio access network (RAN) node, a Protocol Data Unit (PDU) Session Establishment Request message toward a Session Management Function (SMF) in a communication network; and after transmitting the PDU Session Establishment Request message, use the receiver to receive from the RAN node a Radio Resource Control (RRC) Connection Reconfiguration message comprising: i) a PDU session identifier (ID), ii) a PDU Session Establishment Accept message generated by the SMF, and iii) a user plane (UP) security policy for the PDU Session identified by the PDU session ID, wherein
the UP security policy for the PDU session indicates:
i) whether UP confidentiality protection shall be activated or not for all data radio bearers (DRBs) belonging to the PDU session, and/or
ii) whether UP integrity protection shall be activated or not for all data radio bearers (DRBs) belonging to the PDU session.

* * * * *